United States Patent [19]

Clauser

[11] Patent Number: 4,992,656

[45] Date of Patent: * Feb. 12, 1991

[54] ROTATION, ACCELERATION, AND GRAVITY SENSORS USING QUANTUM-MECHANICAL MATTER-WAVE INTERFEROMETRY WITH NEUTRAL ATOMS AND MOLECULES

[76] Inventor: John F. Clauser, 975 Murrieta Blvd. #22, Livermore, Calif. 94550

[*] Notice: The portion of the term of this patent subsequent to Oct. 17, 2006 has been disclaimed.

[21] Appl. No.: 393,285

[22] Filed: Aug. 10, 1989

Related U.S. Application Data

[63] Continuation-in-part of Ser. No. 113,620, Oct. 26, 1987, Pat. No. 4,874,942.

[51] Int. Cl.$^5$ .................... H05H 3/00; G01P 15/00
[52] U.S. Cl. ........................... 250/251; 250/256; 250/269; 324/117 R; 73/382 G
[58] Field of Search ............ 250/251, 256, 269; 73/382 R, 382 G; 324/117 R, 244

[56] References Cited

U.S. PATENT DOCUMENTS 4,602,508  7/1986  Fitch et al. ............... 73/382 G
4,874,942  10/1989  Clauser ..................... 250/251
4,886,964  12/1989  Pritchard et al. ........ 250/251

Primary Examiner—Jack I. Berman
Attorney, Agent, or Firm—Henry P. Sartorio

[57] ABSTRACT

The invention is a neutral atom (and/or molecule) matter-wave interferometer (and/or set of interferometers) that can be used as an inertial sensor with a sensitivity exceeding that of conventional mechanical sensors and multiple circuit optical interferometers (including ring lasers) by many powers of ten. An interferometer in which matter-wave propagation beam paths enclose a finite area will sense rotations via the Sagnac effect. One with the paths displaced from each other will sense acceleration plus gravity. Interferometers with paths that follow a figure-eight pattern yield a gravitational gradiometer. Laser cooling and slowing of a beam of neutral atoms provides a low energy nearly monochromatic source. Diffraction gratings are employed as beam splitters. Such gratings may consist of apertures in a sheet of solid material, near-resonant standing-wave laser beams, or crystal faces. Path curvature due to acceleration and rotation is canceled by magnetic and-/or electric field gradients that produce an effective levitation of slow atoms. A feedback system that maintains an interferometer phase null is employed with its error signal yielding the inertial effect signals. Magnetic and/or electric fields are used for producing matter-wave phase shifts. The invention may be used to measure acceleration, rotation, position, orientation, gravity, the mass distribution of nearby matter, and an electric current. Other important applications are mass tomography, geodesy, and petroleum exploration.

51 Claims, 12 Drawing Sheets

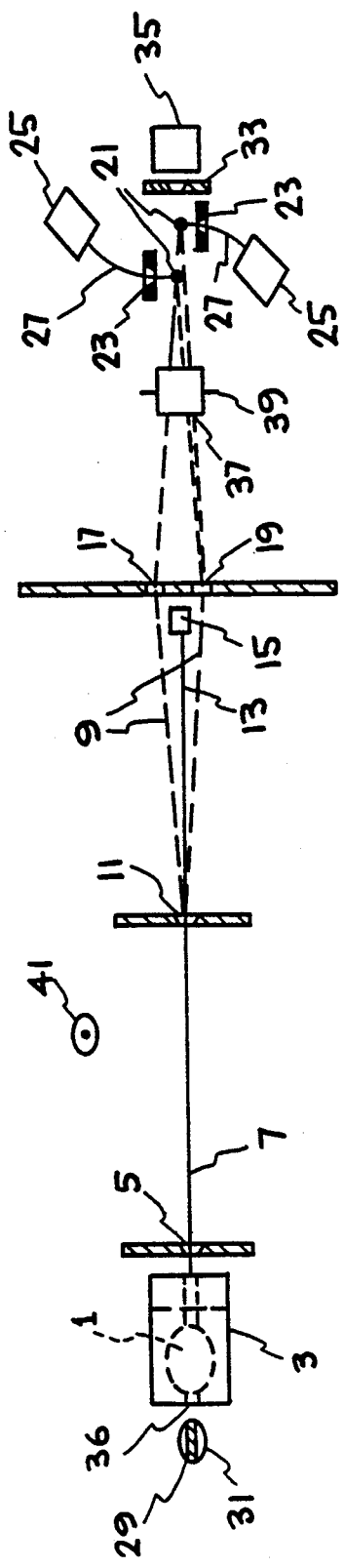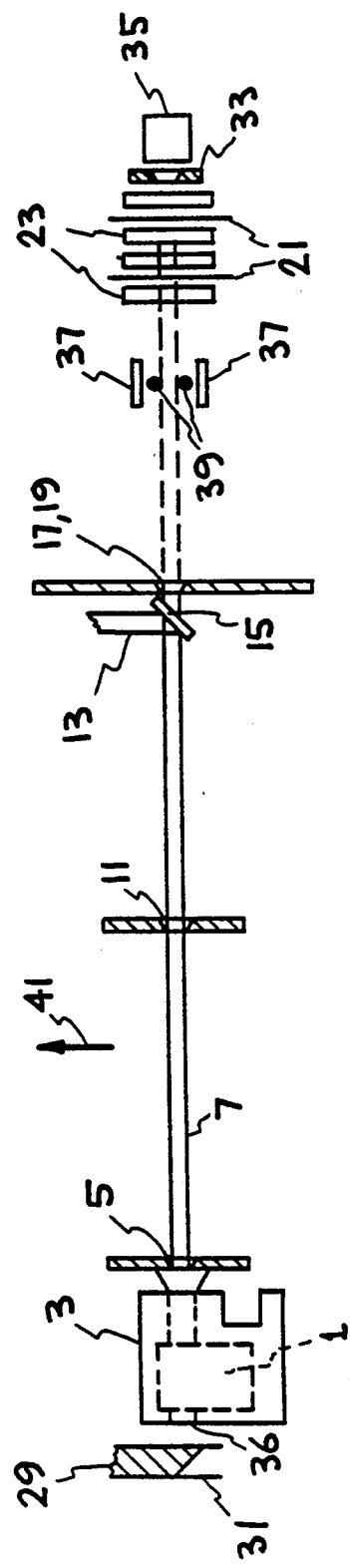

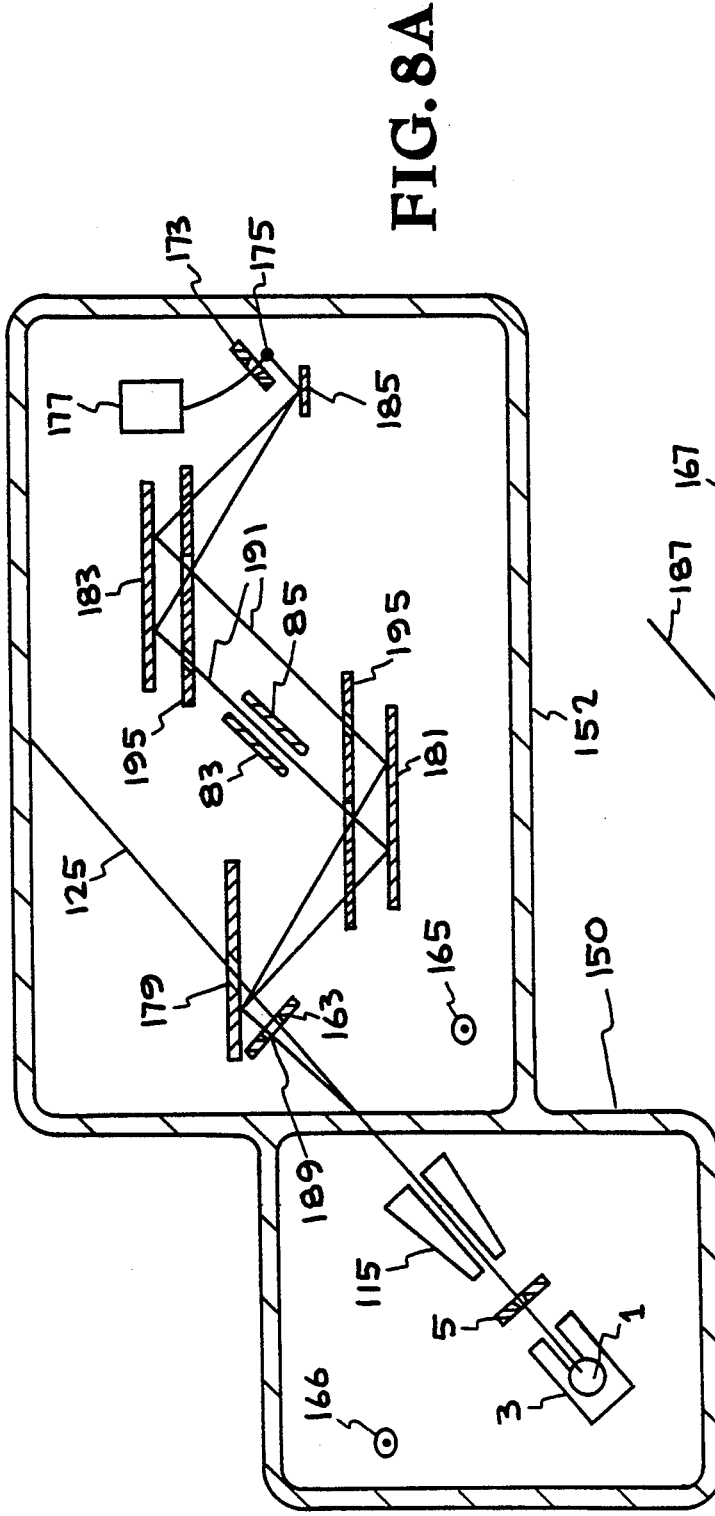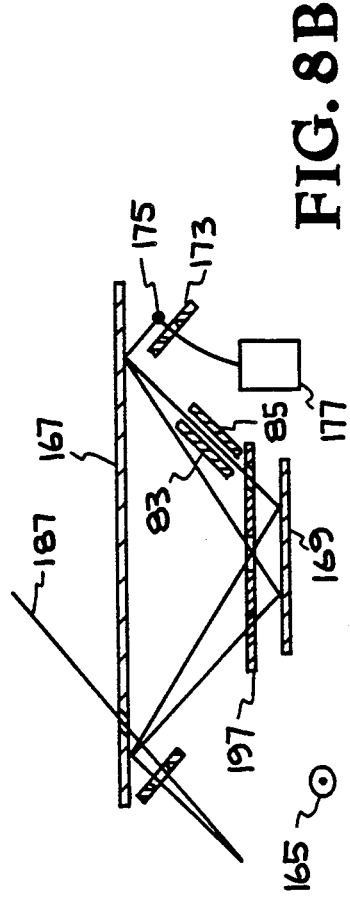
FIG. 8A
FIG. 8B

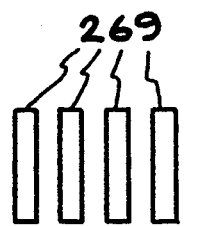
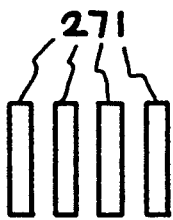
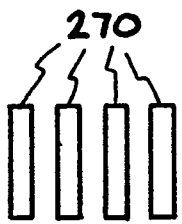
FIG. 11A     FIG. 11B
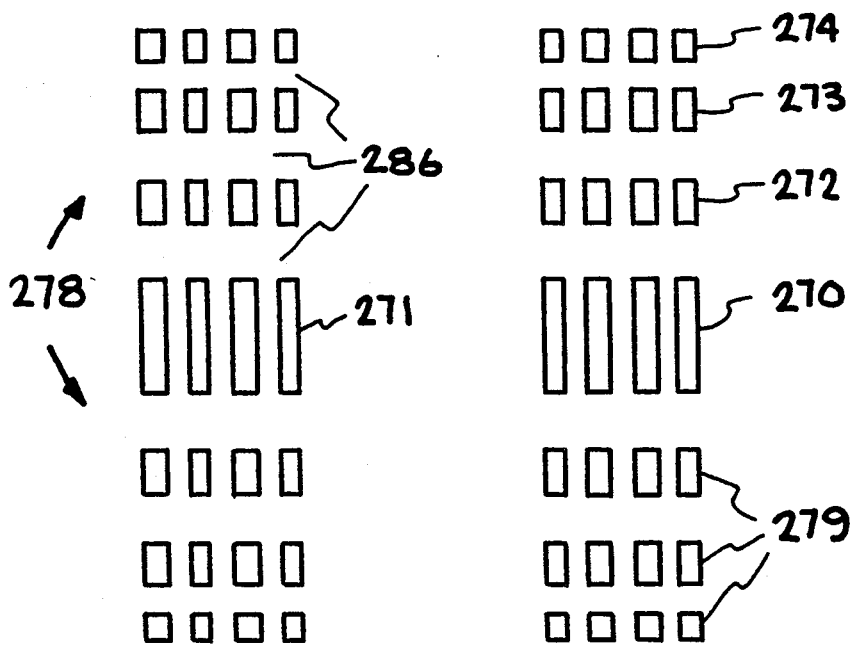
FIG. 11C
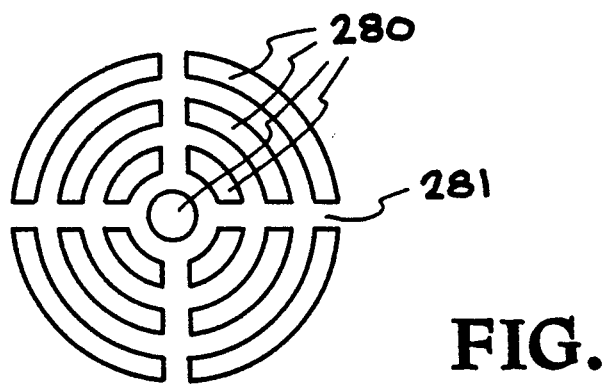
FIG. 11D

ROTATION, ACCELERATION, AND GRAVITY SENSORS USING QUANTUM-MECHANICAL MATTER-WAVE INTERFEROMETRY WITH NEUTRAL ATOMS AND MOLECULES

RELATED APPLICATIONS

This application is a continuation in part (CIP) of Ser. No. 113620 filed Oct. 26, 1987, now U.S. Pat. No. 4,874,942.

I. FIELD OF THE INVENTION

This invention relates to matter-wave interferometry involving neutral atoms and molecules. Its applications include, but are not limited to, uses as an accelerometer, a gyroscope, a gravimeter, a gravitational gradiometer, an instrument that can measure departures of its own motion from an inertial, gravity free and/or freely falling reference frame, a component or set of components for an inertial navigation and guidance system, an instrument that can remotely measure the distribution of mass within an inaccessible volume, a seismograph, an instrument for determining the mass distribution of the earth itself, an instrument for locating underground natural resources such as petroleum, and an instrument for geodesy and gravity surveying that can be employed above, on, or below the earth's surface.

The invention differs from previous art in that it employs quantum-mechanical interference of matter waves, i.e. de Broglie waves associated with particles with non-zero mass. In particular, it involves the use of matter waves associated with low energy neutral atoms and/or molecules. As a result, it is dramatically more sensitive than interferometer arrangements that employ the classical-wave properties of light.

For simplicity, the words "atomic" and "atom" when used herein shall mean "atomic and/or molecular" and "atom and/or molecule", respectively, unless otherwise denoted. Such usage does not restrict the scope of the invention. The term "matter waves" refers herein to the quantum mechanical de Broglie waves associated with the propagation of particles with non-zero mass.

II. BACKGROUND OF THE INVENTION

A. Measurement of Departures From an Inertial Frame

Instruments which can sense departures of their own reference frame from an "inertial reference frame" are of important practical and commercial use, for example, in the area of inertial navigation and guidance. Such departures are limited by Chasle's and Euler's Fixed-Point Theorems of classical mechanics to two basic kinds: rotations, and accelerations. The inertial effects of local accelerations (via Einstein's Equivalence Principle, which experimentally is known to hold to very high accuracy) are indistinguishable from those due to gravitational fields. The effects of simultaneous rotation and acceleration are interlinked via the Coriolis and centrifugal forces.

B. The Distinction Between Classical Waves and Matter Waves

Two important but mutually distinct classes of wavelike phenomena are classical waves and quantum-mechanical matter waves. Classical waves can always be described in terms of mathematically "real" number valued wave amplitude. An important class of classically describable waves are those associated with electromagnetic radiation (including light). Such waves are described by Maxwell's equations. In a vacuum they propagate at the speed of light with equal group and phase velocities. Until the advent of quantum mechanics in the early twentieth century, all wave-like phenomena were thought to be of the classical variety.

Quantum-mechanical waves are fundamentally different from classical waves. The term "matter waves" refers here to the quantum mechanical waves associated with the propagation of particles with non-zero mass. Their wave amplitude can only be described mathematically in terms of "complex" numbers. Their propagation is governed by the Schrödinger equation which inherently involves the use of Planck's constant and the square-root of $-1$. The formalism of quantum mechanics and the so-called wave-particle duality contained therein describes the motion of matter waves and of the associated particles. The de Broglie wavelength of a particle is Planck's constant divided by its momentum. These waves propagate with unequal group and phase velocities, the group velocity being equal to that of the associated particle, while the phase velocity exceeds that of light. The propagation of particles with non-zero mass when wave-like interference phenomena are involved can only be described by the formalism of quantum mechanics.

C. Interferometry

Interferometers are devices in which waves are allowed to propagate along two or more essentially independent paths and then to superpose. At a point of superposition the waves will add constructively or destructively depending upon the relative phases of these waves. A measurement of the total wave amplitudes or intensities at such points is then a measure of the relative phase difference between the paths.

Interferometers have been built for both classical and quantum-mechanical waves, although the discovery of quantum-mechanical wave interference postdated that of classical wave interference by half a century. A quantum-mechanical description of the waves is essential in a discussion of sensing inertial frame departures by a matter-wave interferometer. The opposite is true for a description of optical interferometric inertial sensors. The latter can be analyzed accurately in terms of the propagation of classical electromagnetic waves.

III. PRIOR ART

A. Prior Art in Sensing Rotation, and Acceleration Plus Gravity

Prior art for sensing departures from an inertial frame falls into three basic categories—mechanical devices, interferometric devices, and quantum-mechanical devices.

1. Mechanical Inertial Sensors

Rotation is commonly sensed by the use of gyroscopes, although many other devices (e.g. the surface curvature of a rotating liquid, and a Foucault pendulum) can also sense rotation. Acceleration is commonly sensed by measurement of either the displacement of a restrained mass or the force necessary to restore the displacement of a restrained mass. Masses with elastic restraints (springs) and masses with gravitational restraints (pendulums or pendulums coupled to gyroscopes) are commonly used. One limitation associated with the use of a pendulum is that it can be used to measure only two of the three spatial components of gravity plus acceleration, so that the third component (if needed) must be measured via other means. Devices which measure the third component are commonly called "gravimeters". Broxmeyer (*Inertial Navigation Systems*, McGraw Hill, New York, 1964) discusses prior art that can sense departures from an inertial reference frame, and its application to the practical problems of inertial navigation and guidance. Application of such sensors to inertial navigation and guidance systems in a gimbal-free system ("strapdown mode"), and appropriate equations and mathematical techniques for analysis are further discussed in NATO AGARD lecture series notes (#95, *Strapdown Inertial Systems*, AGARD-LS-95, ISBN 92-835-0214-0; and #133, *Advances in Strapdown Inertial Systems*, AGARD-LS-133, ISBN 92-835-0351-1).

Measurement of a gravitational gradient requires sensing the force of gravity at two separated positions, and determining the difference between the two forces. The classic method and apparatus for doing so was invented by Baron von Eötvös more than a century ago. His apparatus (now called the Eötvös torsion balance) comprises two masses at the ends of a beam that is suspended on a low torsion fiber. The difference between the gravitational forces acting on the two masses provides a torque that causes the beam to rotate. The Eötvös torsion balance is currently a standard tool for gravity gradient measurements.

2. Optical Interferometric Inertial Sensors

It has long been known since the pioneering work of Sagnac, Michelson and others in the early part of the twentieth century (before the development of quantum mechanics) that an optical interferometer, comprised of an arrangement in which two beams of light that circuit an enclosed area in opposite directions, is sensitive to rotational motion of the interferometer. This phenomenon is known as the Sagnac effect. A review of the Sagnac effect for light has been given by Post (Revs. Mod. Phys. 39, p475, 1967). Chow et al. (Revs. Mod. Phys. 57, p61, 1985) discuss the current state of the art for optical interferometers that can sense rotation.

3. Quantum-Mechanical Inertial Sensors

Various quantum-mechanical devices for sensing rotations are discussed by Pomerantsev and Skrotskii (Soviet Phys. Uspekhi 100, p147, 1970). These do not, however, involve the use of matter-wave interferometry.

B. Prior Art in Quantum-Mechanical Matter-Wave Interferometry

Electron matter-wave interferometers have been built and have practical applications in electron microscopy. Simpson (Revs. Mod. Phys. 28, p254, 1956; Simpson Rev. Sci. Instr. 25, p1105, 1954) and Gabor (Revs. Mod. Phys. 28, p260, 1956) discuss the theory and practice of electron interferometers.

Neutron matter-wave interferometers have been built and are described by Werner (Physics Today 33, p24. 1980). Werner et al. (Phys. Rev. Lett. 42, p1103, 1979) demonstrated the effect of the earth's rotation on the quantum-mechanical phase of the neutron via the matter-wave equivalent of the Sagnac effect. Moreover, Colella et al. (Phys. Rev. Lett. 34, p1472, 1975) demonstrated gravitationally induced quantum interference for neutron matter waves.

Here-to-fore no one has offered a method for the application of the scientific principles thus demonstrated with neutrons for providing practical inertial sensing devices. Additionally, no one has provided here-to-fore a method for distinguishing between the phase shift in a matter-wave interferometer due to rotation and that due to the combined effects of acceleration and gravity.

Altshuler and Frantz were issued U.S. Pat. No. 3,761,721 in 1973 for a "Matter Wave Interferometric Apparatus". Their apparatus consisted of a source of particles, a beam-splitter, a pair of beam reflectors, and a particle detector. In their invention, matter waves associated with particles emitted by the source propagate along spatially separated paths that enclose a finite area, in the process being redirected at the beam reflectors, to the particle detector. Alternative embodiments show the particle detector further broken down into a beam analyzer, followed by a detector. For the beam-splitter and analyzer, Altshuler and Frantz employed standing-wave laser transmission-gratings at Bragg's angle. For the beam-reflectors they used a single Bragg reflection into only one order at a crystal face or diffraction by standing-wave laser beams.

Expected uses for their invention included detection of rotation, acceleration and/or gravity. When their interferometer is operated with charged rather than neutral particles, it is also useful for the measurement of the magnetic flux threading the enclosed area.

Altshuler and Frantz also suggested deploying their invention in a spacecraft to detect the presence of another isolated object in space, by sensing the gravitational attraction of the sensed object. Applicant notes that this mode will not work since the spacecraft conveying their accelerometer/gravimeter will itself be attracted to the gravitating isolated nearby object, that is, it will free-fall toward the object and maintain itself in its own inertial reference frame. So doing, their accelerometer/gravimeter will sense no gravitational field.

Despite the early date of Altshuler and Frantz's patent, impractical features of their invention have prevented its actual reduction to practice. Matter-wave interferometry using neutral atoms and molecules has yet to be demonstrated, nor has its sensitivity to rotation, and acceleration plus gravity.

C. Prior Art in the Use of Grating Interferometers and the Diffraction of Matter Waves Wave-front division to produce a closed-circuit interferometer has been accomplished by a number of processes. A particularly useful means for doing so is to use diffraction. Diffraction by a single slit, however, allows a low throughput if large angle deflection is to be obtained. A high throughput is also desirable to allow a reasonable signal level. A far more efficient means for such deflection that is familiar in physical optics is to use a diffraction grating. Since a diffraction grating presents a large frontal area to the incident beam, its throughput is much higher than that of a single narrow slit with the same deflection.

Weinberg et al. (J. Sci. Instr. 36, p227, 1959) have described symmetric and asymmetric configurations for a closed-circuit optical interferometer (that demonstrates interference of light) that uses four diffraction gratings. In these configurations the first grating causes the initial wave-front division, while the last causes the wave-front recombination and/or magnifies the fringe pattern. The middle two gratings (commonly extensions of the same single grating) perform a path redirection so that the separated paths converge on the plane of the fourth grating. An important feature of these interferometer geometry configurations noted by previous workers is their lack of sensitivity to physical displacements of the gratings (e.g. those due to vibrations).

Marton et al. (Phys. Rev. 90, p490, 1953; Rev. Sci. Instr. 25, p1099, 1954) and Simpson (ibid.) used the asymmetric geometry of Weinberg et al. and Bragg diffraction (in transmission) by crystalline foils to produce a matter-wave interferometer for electrons. Bonse and Hart (Appl. Phys. Lett. 6, p155, 1965) employed a similar geometry and Bragg diffraction (in transmission) by pure silicon crystals to produce a matter-wave interferometer for neutrons. The demonstrations by Colella et al. and Werner et al. cited above used the neutron interferometer of Bonse and Hart. Diffraction of the matter waves associated with neutral potassium atoms by a single slit has been demonstrated by Leavitt and Bills (Amer. J. Phys. 37, p905, 1969). Diffraction of the matter waves associated with neutral sodium atoms by near-resonant standing-wave laser light has been observed by Gould et al. (Phys. Rev. Lett. 56, p827, 1986). In their experiment, significant usable intensity is produced in eighth and higher order diffraction.

D. Prior Art in Slowing and Cooling Atomic Beams

Two different methods to generate nearly monoenergetic and, more importantly, slow atomic beams have recently been demonstrated. Schwartschild (Physics Today 39, p17, 1986) and Wineland and Itano (Physics Today 40, p34, 1987) discuss such techniques. Presumably, slow, cool molecular beams may be produced by similar means. Prodan et al. (Phys. Rev. Lett. 49, p1149, 1982; see also Prodan et al. Phys. Rev. Lett. 54, p992, 1985; and Phillips and Metcalf Phys. Rev. Lett. 48, p596, 1982) have described a technique to produce a temporally continuous beam. It involves the use of a tapered magnetic solenoid to continuously Zeeman shift the optical resonance wavelength of the beam as it is slowed and cooled by a counter-propagating laser beam whose wavelength is near that optical resonance. Ertmer et al. (Phys. Rev. Lett. 54, p996, 1985; see also Chu et al. Phys. Rev. Lett. 57, p314, 1986) have described an alternative technique that produces a temporally pulsed beam. It uses a pulsed laser whose wavelength is swept (chirped) during the pulse to maintain resonance as the atoms are being slowed and cooled.

The above techniques for slowing atomic beams also have the feature that they also cool the beam (narrow its velocity spread) without a severe reduction of its intensity (flux per unit velocity interval). Mechanical velocity selectors (e.g. those comprised of rapidly rotating toothed disks or grooved wheels), although applicable here, have the undesirable feature that they severely diminish this intensity.

IV. OBJECTS OF THE INVENTION

It is an object of the invention to provide practical matter-wave interferometers in a variety of configurations that employ neutral atoms and/or molecules.

It is another object of the invention to provide practical matter-wave interferometers that employ neutral atoms and/or molecules, and that measure rotation rate.

It is another object of the invention to provide practical matter-wave interferometers that employ neutral atoms and/or molecules, and that measure acceleration plus gravity and/or acceleration plus gravity gradients.

It is another object of the invention to provide practical matter-wave interferometers that measure acceleration plus gravity and/or acceleration gradients, while simultaneously, independently measuring rotation rate.

It is yet another object of the invention to provide practical matter-wave interferometers that measure changes in their orientation, velocity and position.

It is yet another object of the invention to provide practical matter-wave interferometers that employ high-mass and/or low-velocity neutral atoms and/or molecules.

It is a further object of the invention to provide practical matter-wave interferometers in which the deflection of the matter-wave paths is by diffraction by a slit or slits in a solid material.

It is a further object of the invention to provide practical matter-wave interferometers in which the deflection of the matter-wave paths is by diffraction by slits in a solid material, arranged so that they form a grating in one direction and a focusing grating in an orthogonal direction.

It is a further object of the invention to provide practical matter-wave interferometers in which the deflection of the matter-wave paths is by diffraction by apertures in a solid material, arranged so that they form concentric annular slits, including annuli that are circular or elliptical.

It is a further object of the invention to provide practical matter-wave interferometers in which the deflection of the matter-wave paths is by diffraction by apertures in a sheet of solid material, arranged so that propagation paths through an aperture of the sheet are an integral number of deBroglie wavelengths different from propagation paths through a different aperture.

It is a further object of the invention to provide practical matter-wave interferometers that employ neutral atoms and/or molecules in which the deflection of the matter-wave paths is due to the electric-dipole-induced-image-electric-dipole interaction between an atom and a conducting surface and/or the permanent-electric-dipole-image-dipole interaction between a polar molecule and a conducting surface.

It is a further object of the invention to provide practical matter-wave interferometers in which the deflection of the matter-wave paths is due to their interaction with an electromagnetic wave or waves.

It is a further object of the invention to provide a practical matter-wave interferometer in which the deflection of the paths of the matter waves is due to their interaction with an electromagnetic wave or waves, that is insensitive to positional displacements of its components from each other, including displacements due to instrument vibration.

It is a further object of the invention to provide a practical matter-wave interferometer in which the deflection of the paths of the matter waves is due to their interaction with an electromagnetic wave or waves, and that focuses the paths when a spread of matter-wave beam energies is present.

It is another object of the invention to provide a practical means for measuring the interference fringe pattern produced in a matter-wave interferometer by employing the interaction of a standing matter-wave fringe pattern in the superposition region of an interferometer and a standing electromagnetic wave whose wavelength nearly matches that of the standing matter-wave fringe pattern, and by measuring the flux of radiations emitted by this interaction.

It is yet another object of the invention to provide practical matter-wave interferometers to measure both rotation, and acceleration plus gravity simultaneously and to distinguish between them, and that compensate for and approximately cancel the beam deflection due to rotation and/or acceleration plus gravity through the application of external deflecting potentials and/or through mounting the interferometer system on gimbals.

It is yet another object of the invention to provide practical matter-wave interferometers to measure both rotation, and acceleration plus gravity simultaneously and to distinguish between them, and that compensate for and approximately cancel the beam deflection due to rotation and/or acceleration plus gravity through the application of external deflecting potentials and/or through mounting the interferometer system on gimbals, wherein the applied potentials and/or gimbals are controlled by a feedback system that maintains null interferometer fringe shifts, and wherein the output signal is derived (at least partially) from the error signal of this feedback system.

It is yet another object of this invention to provide practical matter-wave interferometers for use as inertial sensors, wherein interferometer geometry is measured and/or stabilized by the use of X-ray interferometry along or near the matter-wave paths.

It is yet another object of this invention to provide a practical matter-wave interferometer for use as an inertial sensor, wherein the interferometer geometry is measured and/or stabilized by the use of an optical interferometer.

It is another object of this invention to provide an apparatus that can remotely measure the distribution of mass within an inaccessible volume, including portions of the earth itself.

It is yet a further object of this invention to provide an apparatus for locating underground natural resources such as petroleum and minerals, that can be employed above, on, or below the earth's surface.

Other objects, purposes and characteristic features will become clear in the following description of the invention.

V. SUMMARY OF THE INVENTION

The invention is a practical matter-wave interferometer or set of interferometers that provides a high sensitivity inertial sensor. It can assume a variety of configurations, and employs the quantum-mechanical matter waves associated with the propagation of neutral atoms and/or molecules. As an inertial sensor, it can measure rotation rate, acceleration plus gravity, or both simultaneously and distinguishably. Correspondingly, the output signals from the interferometers can be used to determine position, velocity and orientation. In a particular class of configurations, it can measure gravitational gradients and/or rotation axis position and orientation. Furthermore, the use of the invention is not limited to the domain of an inertial sensor, but can sense other influences to the matter waves including a variety of electromagnetic interactions of atoms and molecules as well as many other fundamental physical interactions such as the newly sought composition-dependent fifth-force.

The matter-wave path geometry is configured so that the paths enclose a finite area and/or are displaced from each other in position. The path positional displacement makes it sensitive to gravitation and acceleration, while the enclosure of a finite area makes it also sensitive to rotation. The class of path configurations useful for measuring gravitational gradients are generalizations of a basic figure-eight geometry. They consist of two (or more) area enclosing loops (and/or positionally displaced path-pair segments) sequentially cascaded with each such enclosure (and/or displaced path-pair segment) displaced from the position of the next, and with each such enclosure (and/or segment) circuited in the opposite sense (clockwise or counter-clockwise) of the next.

The matter-wave path deflections necessary to achieve these geometries are produced by a variety of means. These include diffraction of the matter waves by one or more slits in solid materials, deflection by the electric-dipole induced image electric-dipole interaction between an atom and a conducting surface, deflection by the permanent electric-dipole image-dipole interaction between a polar molecule and a conducting surface, deflection by the interaction between a propagating particle and electromagnetic fields and/or waves, by Bragg reflection from a crystal surface, and deflection by various other applied potentials.

The invention is configured in a variety of ways. A particular class of configurations renders it insensitive to positional displacements of its components from each other, including displacements due to instrument vibration. Another class allows it to focus the paths when a spread of matter-wave beam energies is present, and/or to select a narrow range of matter-wave beam energies.

An additional feature of some configurations of the invention is a method for determining the phase of a standing matter-wave interference fringe pattern produced in the interferometer superposition region. These configurations employ the interaction of the standing matter-wave pattern with a grating (or with a standing electromagnetic wave that acts as a grating) whose spatial periodicity (wavelength) is nearly matched with that of the standing matter-wave fringe pattern, and then image and detect the resulting flux of emitted interaction products.

Another feature of the invention is its ability to compensate for matter-wave path deflections that are due to inertial effects. It employs a variety of means. One method is to rotationally mount each interferometer on gimbals. Another is to apply additional potentials that deflect, and/or retard, and/or accelerate the matter-wave propagation. The applied potentials and/or gimbals can then be controlled by a feedback system that maintains null interferometer fringe shifts. The output signals for the system are then derived from the uncancelled phase shift and from the error signal of this feedback system.

Matter-wave path geometry is stabilized (or otherwise compensated) within the invention by a variety of means. One such means is the use of X-ray interferometry along or near the matter-wave paths. In such a case the X-ray wavelength approximately matches that of the matter wave. Another means for geometry stabilization is to use optical wave interferometry. The sense and direction of changes in the interference pattern that are due to inertial effects are monitored by the insertion of additional matter-wave phase delays. These delays are produced by the application of additional potentials. Moreover, these additional phase delays can also be used as another monitor of matter-wave path geometry.

When interferometers whose slits have a rectangular geometry are used with each one producing only one result and propagating atoms with a single mass and energy, then six interferometers are needed to measure simultaneously the three components of the rotation vector plus the three components of the acceleration plus gravity vector. If more than one mass and/or energy is propagated through each interferometer, then the number of interferometers needed to accomplish the same task can be reduced to three, since each interferometer can produce two results. Moreover, axi-symmetric configurations for the invention may be used to reduce the required number even further, since an interferometer in such a configuration can provide again twice as many simultaneous results for measurements related to two simultaneous orthogonal axes. An important class of applications for gravity gradiometers requires only one interferometer in an axi-symmetric configuration.

Focusing of the atomic beams and matter-wave propagation paths is another important feature of the invention. The geometries of many of the configurations of the invention allow focusing a spread of beam energies. In addition, various geometries for the invention allow additional geometrical focusing through the use of principles well known in the field of physical optics, herein adapted to the new and unfamiliar area of neutral-atom propagation.

The invention has applications in any area traditionally used for inertial and gravity sensors, such as navigation, geodesy, etc. In addition its unique features involving quantum-mechanical matter-wave interference permit additional applications such as measuring an electric current. Another important class of applications is further created via the extreme sensitivity of the invention as an inertial and gravity sensor to areas where existing sensors lack sufficient sensitivity to be useful. One of these areas is the application to mass tomography, wherein the mass distribution of an inaccessible volume is measured. Industrial inspection, and petroleum exploration are then facilitated by use of the invention.

VI. BRIEF DESCRIPTION OF THE DRAWINGS

FIGS. 6a and 6b are plan and side views of an embodiment of the invention that uses the pulsed atomic beam slowing technique, path deflection by diffraction by slits in a solid material, and X-ray geometry stabilization. This set of components resides inside the coil set shown in FIGS. 9a and 9b.

FIG. 8a is a plan view of an embodiment of the invention that uses the continuous atomic beam slowing technique, path deflection by Bragg reflection on crystal faces. Its geometry is stabilized by X-ray interferometry (components not shown) in a manner similar to that of the embodiment of FIGS. 7a and 7. Most of its components reside inside the coil set shown in the diagram of FIG. 10.

FIG. 8b is a plan view of an alternative path and crystal configuration to that of FIG. 8a. It is used for measuring gravitational gradients. Most of its components reside inside the coil set shown in the diagram of FIG. 10.

Figure 7A:
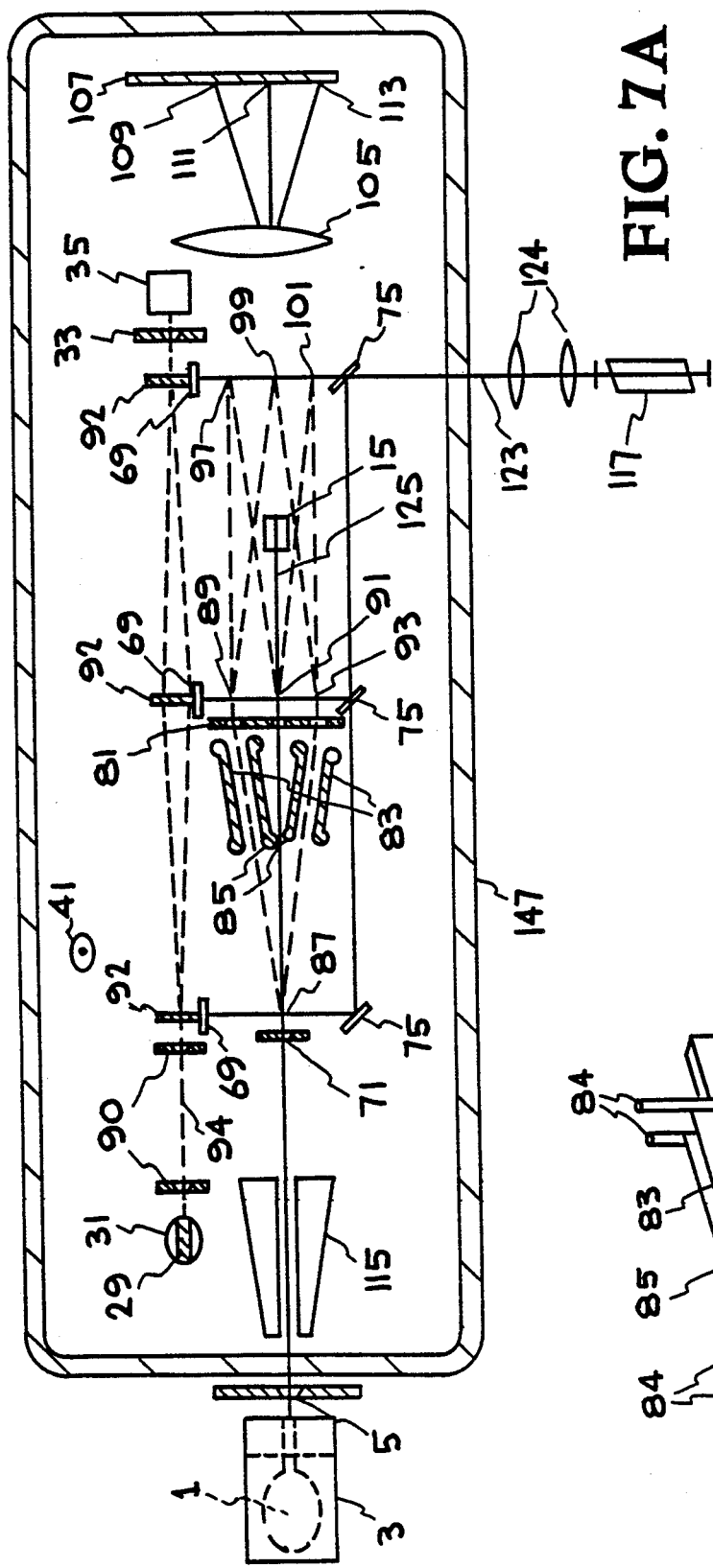
FIG. 7a is the plan view of an embodiment of the invention that uses the continuous atomic beam slowing technique, path deflection by diffraction by electromagnetic standing waves, and geometry stabilization by an X-ray interferometer system. Most of its components reside inside a modification of the coil set shown in FIGS. 9a and 9b.
Figure 9A:
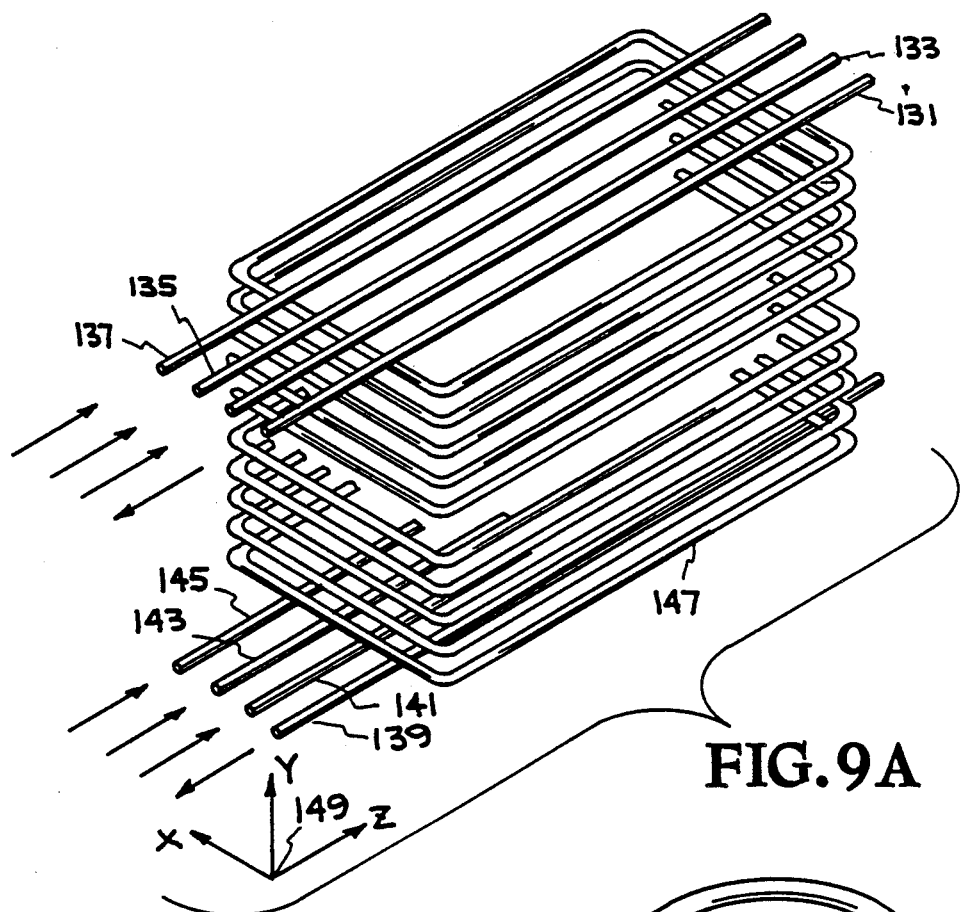
Figure 9B:
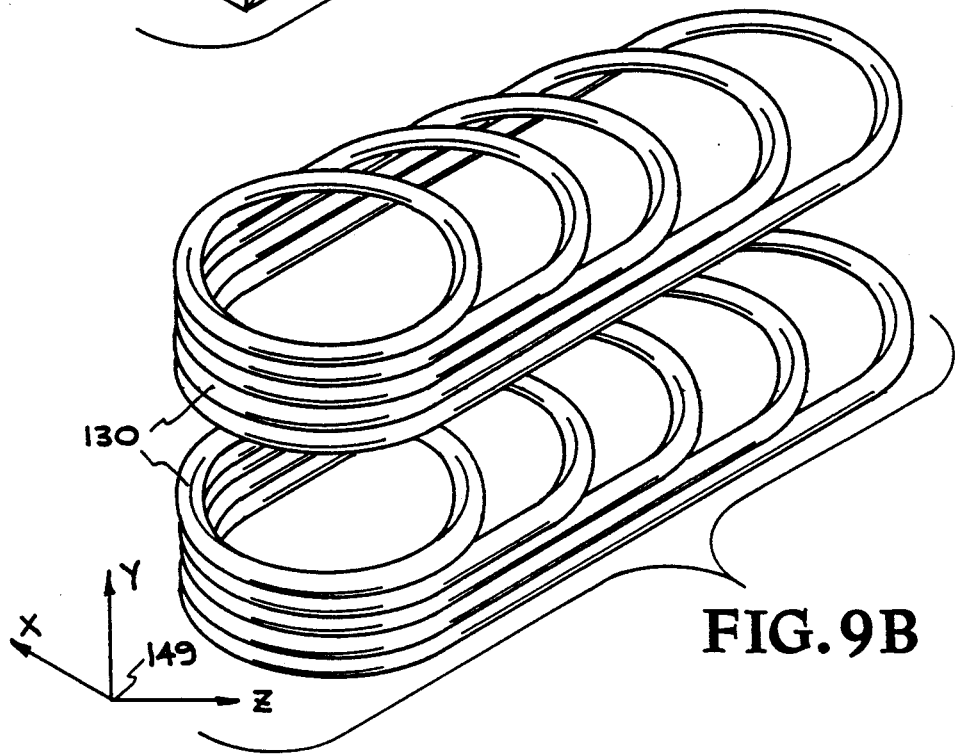

FIGS. 9a and 9b show magnetic field coil sets used with the embodiments of FIGS. 6a, 6b and 7a. The windings shown in FIG. 9b may be placed either inside or outside of the longitudinal current carrying bars 131-145 shown in FIG. 9a. When these coils are used with the embodiment of FIG. 7a, the windings of the solenoid coil are displaced slightly to allow passage of the atomic and laser beams between them.

Figure 10:
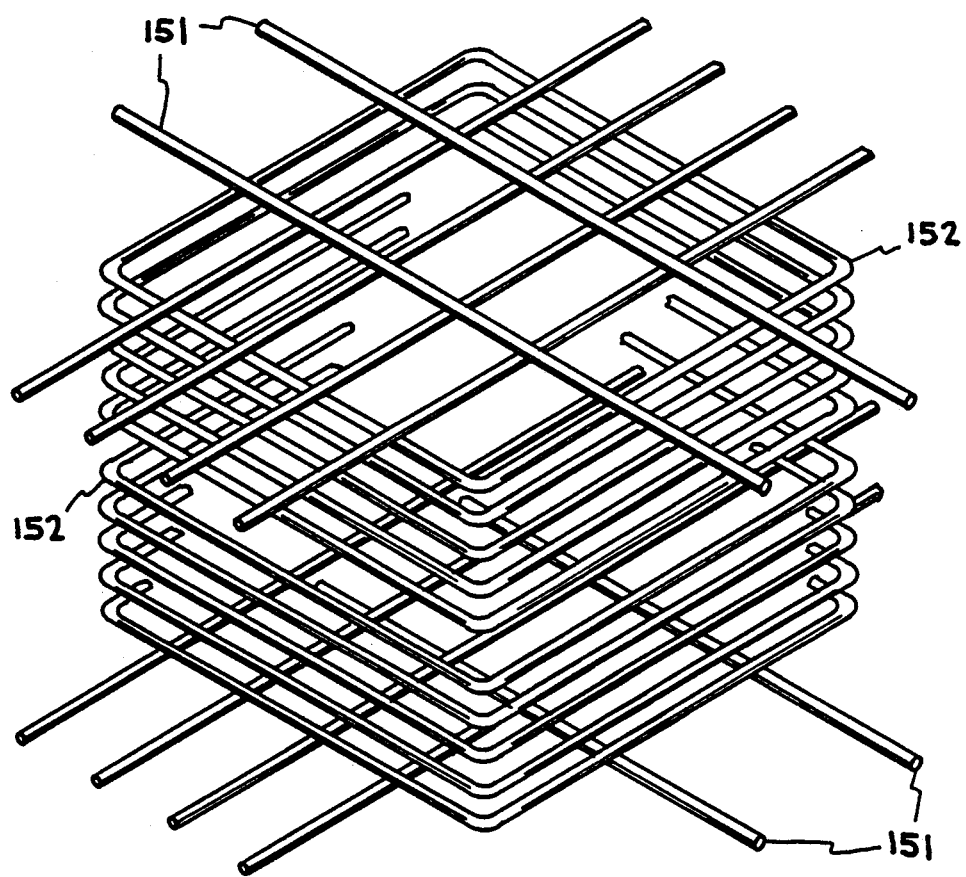

FIG. 10 shows an alternative magnetic field coil set that is used with the embodiments of the diagrams of FIGS. 8a, and 8b. To improve clarity, solenoid 150 is not shown.

FIG. 11a shows a combined collimator and grating that may be used to combine gratings 16, 20 G1 and G6 with their associated collimating slits onto a common plane in embodiments that utilize the geometries of FIGS. 4a through 4f. Its use reduces the number of sheets containing slits, through which the matter waves must pass. In the embodiment of FIGS. 6a, b it may be used in place of slit 11 and additionally inserted immediately ahead of hot wires 21 to provide a fringe mask, thereby allowing that embodiment to utilize geometries similar to those of FIGS. 4a–d.

FIG. 11b shows a combined collimator and grating that may be used to combine gratings 18, G2, G3, G4, and G5 with their associated collimating slits onto a common plane in embodiments that utilize the geometries of FIGS. 4a through 4f. Its use reduces the number of sheets containing slits, through which the matter waves must pass. In the embodiment of FIGS. 6a, b it may be used in place of slits 17 and 19, thereby allowing that embodiment to utilize geometries similar to those of FIGS. 4a-d.

FIG. 11c shows an alternative slit arrangement to that of FIG. 11b that utilizes Fresnel optics to achieve focusing in a direction parallel to the slit long direction.

FIG. 11d shows an axi-symmetric slit configuration for an axi-symmetric interferometer that can be used in place of the configuration of FIG. 11a.

Figure 11E:
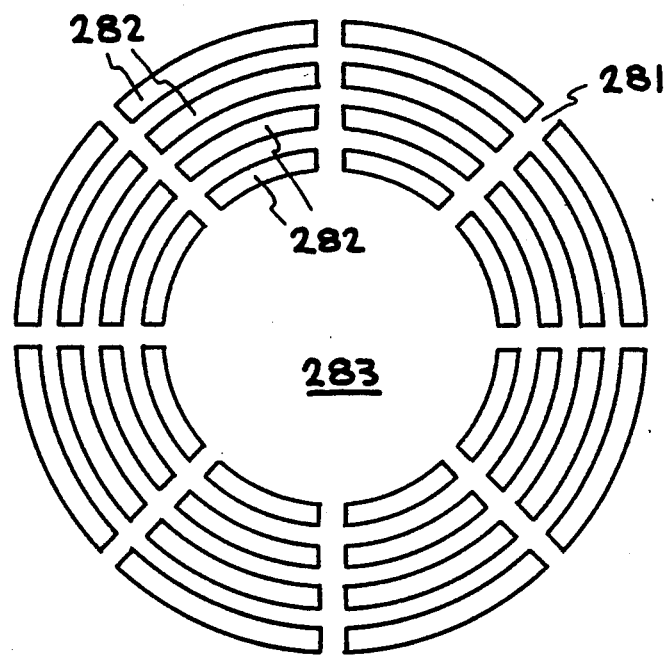

FIG. 11e shows an axi-symmetric slit configuration that can be used in an axi-symmetric interferometer in place of the configurations of FIGS. 11b and 11c. The full slit configuration has slits that approximate circular rings, broken by radial structural features.

Figure 11F:
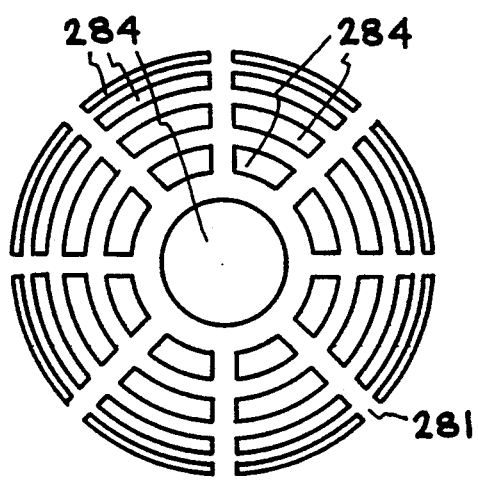

FIG. 11f shows an axi-symmetric slit configuration utilizing Fresnel optics that can be used to generate a parallel input atomic beam for an interferometer. This configuration includes a gradation of the slit widths and spacings.

Figure 11G:
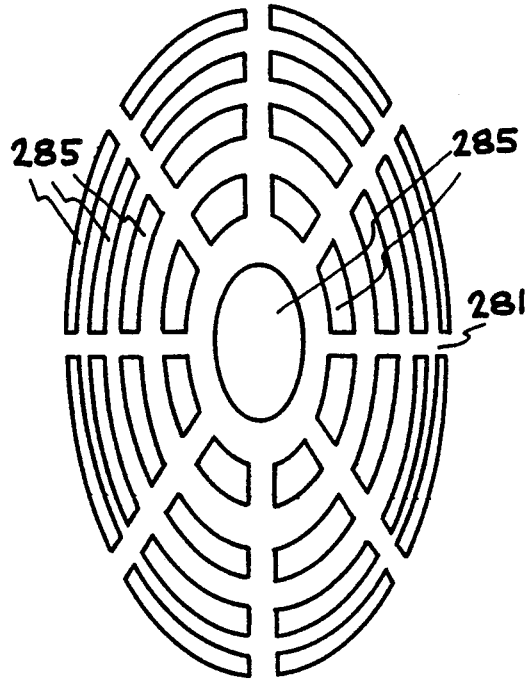

FIG. 11g shows a coaxial elliptical slit configuration utilizing Fresnel optics that can be used to generate a parallel input atomic beam for an interferometer. This configuration also includes a gradation of the slit widths and spacings.

Figure 12A:
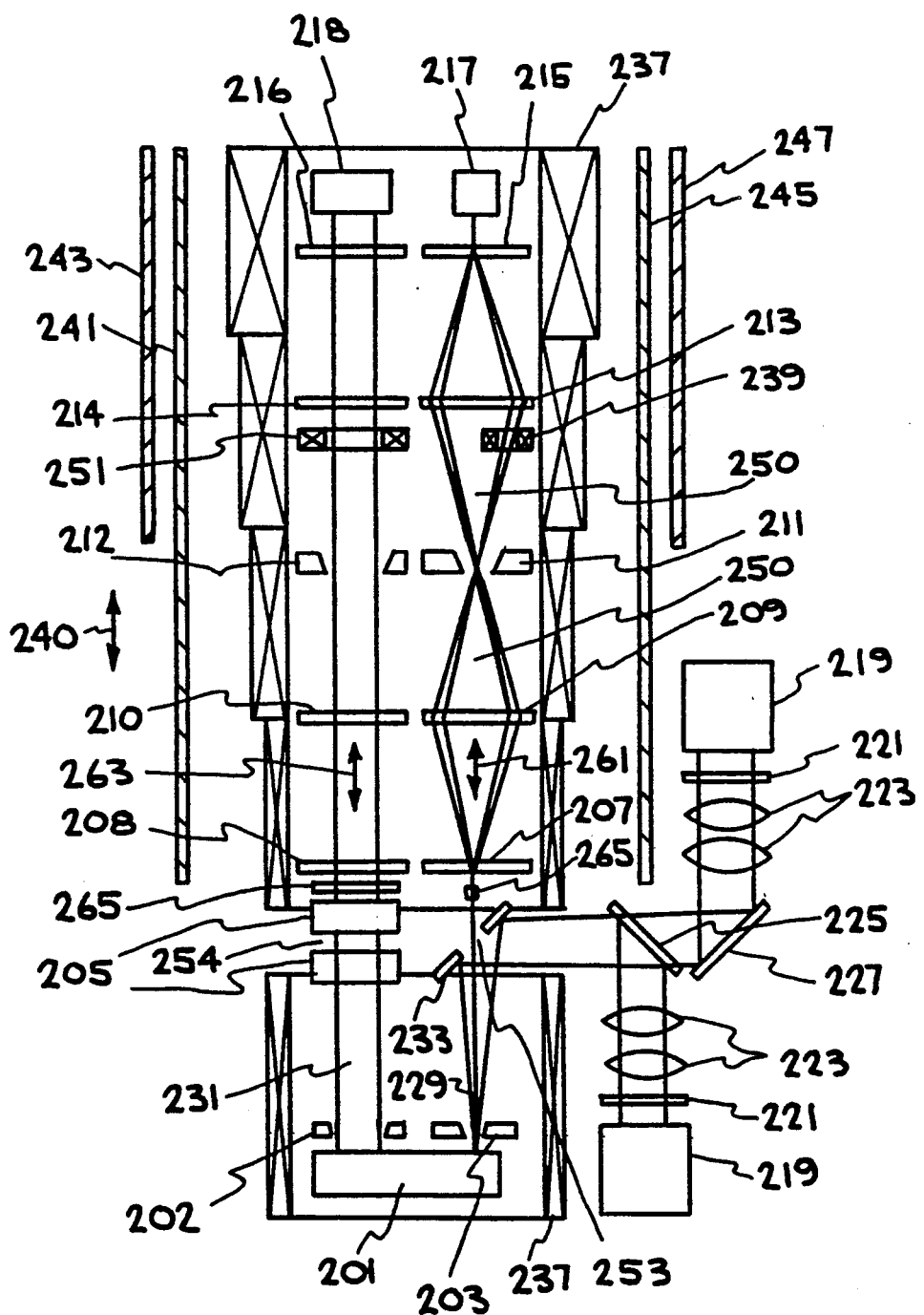

FIG. 12a shows an embodiment of the invention that is suitable for use in petroleum exploration when lowered into a bore hole. It consists of two orthogonally oriented, gradiometer-configured interferometers, whose axes are each parallel to the axis of the bore hole.

Figure 12B:
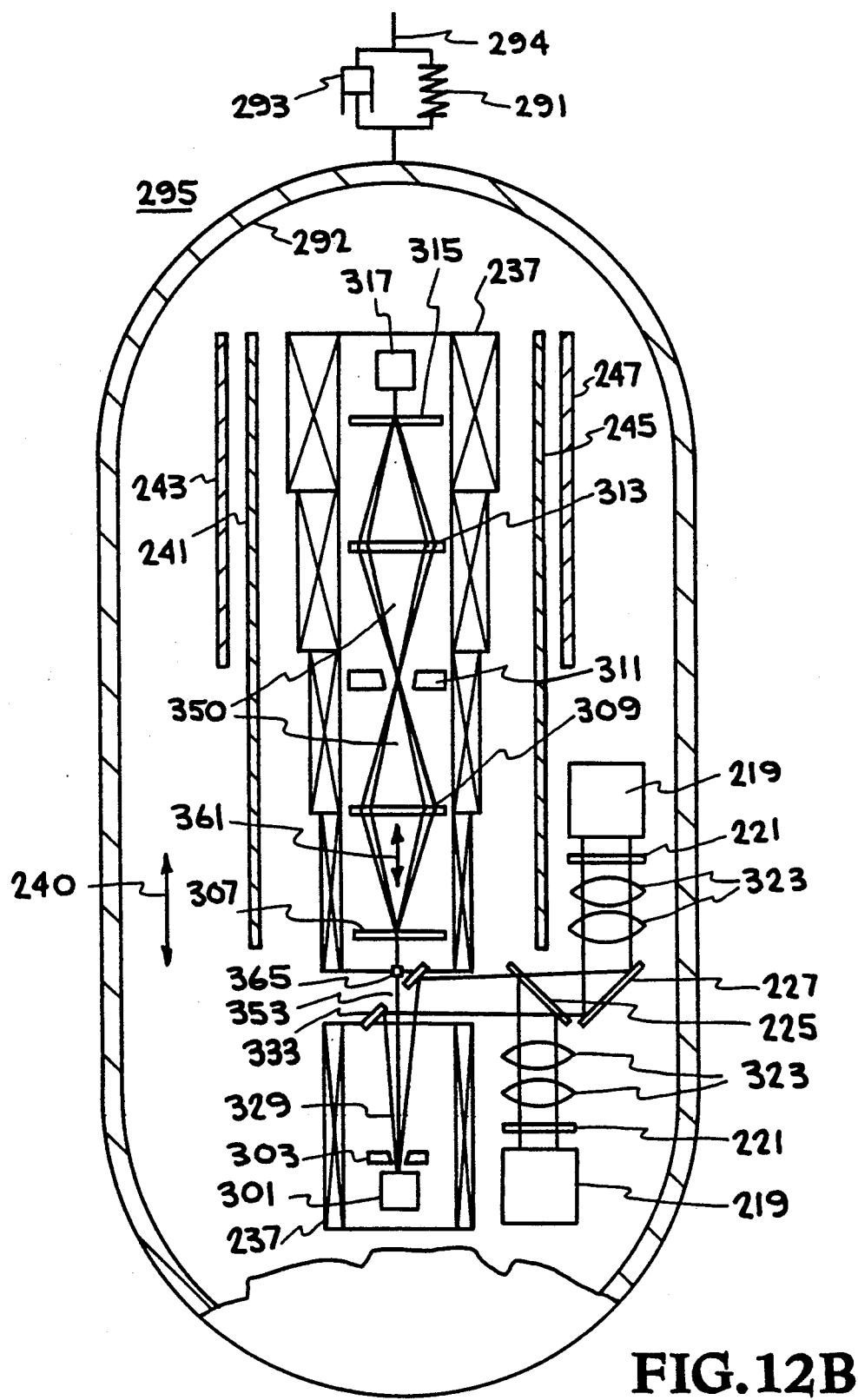

FIG. 12b shows an alternative embodiment to that of FIG. 12a, consisting of a single gradiometer-configured interferometer. It utilizes the axi-symmetric gratings of FIGS. 11d and 11e.

Configurations involving interchange and/or substitution of components from those indicated in these Figures provide additional preferred embodiments.

VII. PRINCIPLES OF OPERATION OF THE INVENTION

(A) A Simple Matter-Wave Interferometer Arrangement

Figure 1:
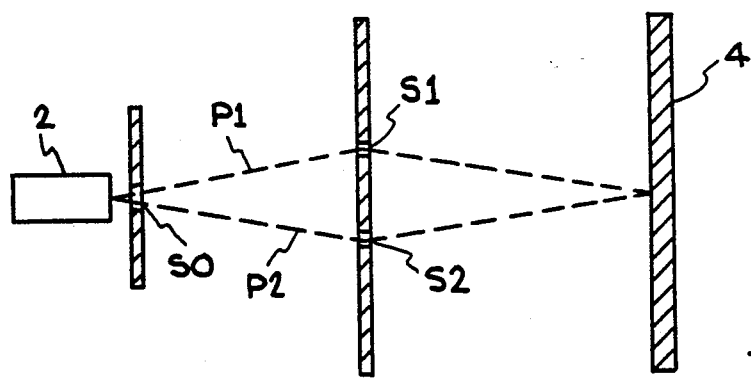
FIG. 1 is a diagram of a simple interferometer for neutral atom and/or molecule matter waves.

A simple interferometer arrangement for neutral atom matter-waves is depicted in FIG. 1. (Its geometry is similar to that of the classic Young's double slit experiment for light.) Atoms of mass m are emitted by source 2, and are collimated by narrow slit SO. Source 2 may be, for example, a simple oven. From slit SO, the matter waves associated with the atoms propagate via two simultaneous paths P1 and P2 through narrow slits S1 and S2 where they diffract and/or are deflected by various applied potentials, and thence to a detection screen 4, where the wave paths superpose after having thus enclosed a finite area A. The flux of atoms impinging on the screen 4 is then detected at various locations on the screen in such a way that the interference fringe pattern thus formed via the different lengths along the two paths is measured. The fringe shift caused by any path phase differences is measured by an array of detectors comprising screen 4 that measure the image of the interference fringe pattern.

(B) Measuring Rotations

First assume that the above arrangement is rotating about an axis perpendicular to the plane formed by the two paths and located at the center of the enclosed area. (A different choice for the rotation axis will introduce centrifugal accelerations not equal for both paths. That case will be discussed in a subsequent Section.) If one views the atoms as propagating in an inertial reference frame, then the apparatus is rotating relative to this reference frame. If the rotation is in a clockwise sense, then the distance along the upper path to the detectors will be lengthened relative to that along the lower path, since the slits and detectors will move during the propagation from the source SO to the detectors. Thus, the detectors will sense a phase shift due to the rotation of the apparatus.

To calculate this phase shift, one must employ quantum mechanics and consider the matter waves as propagating in a rotating reference frame and include the effects of Coriolis and centrifugal potentials acting upon them during their propagation. The calculation is simplified by use of the WKB approximation.

If p is a unit vector perpendicular to the plane of the paths, A is their enclosed area, $\beta$(radians) is the phase shift between the two paths due to rotation, then the component of the rotation rate vector, $\Omega$, (radians per second) in the direction p is given by $$\Omega \cdot p = \frac{\beta h}{4\pi m A}, \quad (1)$$

where h is Planck's constant. The sensitivity of the interferometer to rotation can be increased by allowing multiple circuits about the enclosed area, by increasing the enclosed area, or by increasing m, the mass of the propagating particles.

This simple interferometer can thus measure rotation rates about an axis perpendicular to its plane. An instrument composed of three interferometers, each sensing a different component of $\Omega$ can thus be employed to measure all three components of the rotation rate vector, $\Omega$, of the instrument as a function of time. Integrating $\Omega$ with respect to time (accounting for the lack of commutativity of successive rotations), one can then obtain the time-dependent orientation of the interferometer.

An analogous arrangement in which the propagating waves are light is far less sensitive to rotation than is the one described above using matter waves. Inverting Eq. (1) for matter waves, the phase shift in terms of the rotation rate and area are given by $$\beta(m > 0) = \frac{4\pi m A (\Omega \cdot p)}{h},$$

whereas the analogous relation for the interferometer using light (or other electromagnetic radiation) is $$\beta(\text{light}) = \frac{4\pi A (\Omega \cdot p)}{\lambda c},$$

where $\lambda$ is the wavelength of the light and c is the speed of light. For the same areas, the ratio of the sensitivies is then $m\lambda c/h$. For example, taking m equal to the mass of a $Hg^{202}$ atom and $\lambda$ equal to 6328 Å, i.e. the wavelength of a helium-neon laser, the ratio of the sensitivities is then roughly $10^{11}$. Even though it is straightforward to allow the light to traverse many circuits of the enclosed area, thereby increasing the area of an optical interferometer to many times that achievable with a matter-wave interferometer, this ratio is so large that it is exceedingly difficult for an optical interferometer to approach that of a matter-wave interferometer to rotation.

(c) Measuring Accelerations

Next, assume that the whole arrangement is accelerating and/or under the influence of gravity. If one considers the interferometer to be in an acceleration free reference frame with an equivalent pure gravitational field acting upon it, then the atoms propagating in it will sense the effective gravitational potential. Since the paths are displaced from each other in this potential, atoms propagating through slit S1 will sample a different gravitational potential from those through slit S2. As a result, each path will experience a different phase shift.

The net phase shift between the two paths may be calculated by employing quantum mechanics and using the appropriate gravitational potential along the paths. The use of the WKB approximation again simplifies the calculation. So doing, one finds the component of the acceleration plus gravity vector, $a+g$, in the direction $d$ in terms of the resulting phase shift, $\alpha$, to be given by $$(a + g) \cdot d = \frac{\alpha h \sqrt{\frac{E}{8}}}{\pi m^{1.5} L y}, \quad (2)$$

where $d$ is a unit vector in the plane of the paths, perpendicular to the line between the source and detector, $L$ is the path length from source to slit and from slit to detector, $y$ is one half the spacing between the slits, and $E$ is the particles' kinetic energy. (For simplicity, all four diagonal path lengths have been taken to be equal.) Thus the interferometer will sense a phase shift due to the net real acceleration of the apparatus plus the equivalent acceleration due to gravity. If the interferometer is neither rotating nor in a gravitational field (or in a known gravitational field whose influence can be subtracted), then the first integral with respect to time of Eq. (2) yields the interferometer's velocity component in the direction $d$, while the second integral yields the position component in that direction.

An analogous configuration in which the propagating waves are light is far less sensitive to acceleration plus gravity than is the one described above using matter waves. Inverting Eq. (2) for matter waves, the phase shift in terms of the rotation rate and area are given by $$\alpha(m > 0) = \frac{\pi m^{1.5} L y[(a + g) \cdot d]}{h \sqrt{\frac{E}{8}}},$$

whereas the analogous relation for an interferometer using light is $$\alpha(\text{light}) = \frac{4 \pi L y[(a + g) \cdot d]}{\lambda c^2},$$

where $\lambda$ is the wavelength of the light and $c$ is the speed of light. For the same areas, the ratio of the sensitivities is then $$\frac{2 m \lambda c^2}{h \nu},$$

where $\nu$ is the velocity of the atoms. If one takes $m$ equal to the mass of a $Na^{23}$ atom, $\nu$ equal to 50 m/sec (comparable to that produced easily with sodium atoms in laser cooling and slowing experiments), and $\lambda$ equal to the wavelength of a He—Ne laser, the ratio of the sensitivities is then roughly $1.4 \cdot 10^{17}$. Even though it is straightforward to allow the light paths, once separated, to fold back and forth many times, the sensitivity ratio is so large that it is exceedingly difficult for an optical interferometer to approach that of a matter-wave interferometer to acceleration plus gravity.

(d) Simultaneously Measuring Rotation and Acceleration Plus Gravity

When rotation and acceleration plus gravity are present simultaneously, then the interferometer arrangements described above will give phase shifts that are due to both causes. For an arbitrary rotation axis, there will be a phase shift contribution from the centrifugal force proportional to $\Omega^2$ when the center of rotation is not at the center of the enclosed area. (This contribution was temporarily neglected in the discussion of rotation above.) If the center of rotation is remote from the interferometer, the centrifugal force may be approximated as a simple linear acceleration. If not, then additional phase shift terms of second order (and perhaps higher order terms due to other effects) will contribute to the net phase shift and the analysis becomes more complicated (but still quite tractable).

The higher order phase shift contributions will involve products of the effective acceleration and rotation rate, each taken to various powers. Only the first order analysis will be described here, but this simplification to the description of the invention does not indicate a limit to the capabilities of the invention.

Figure 2:
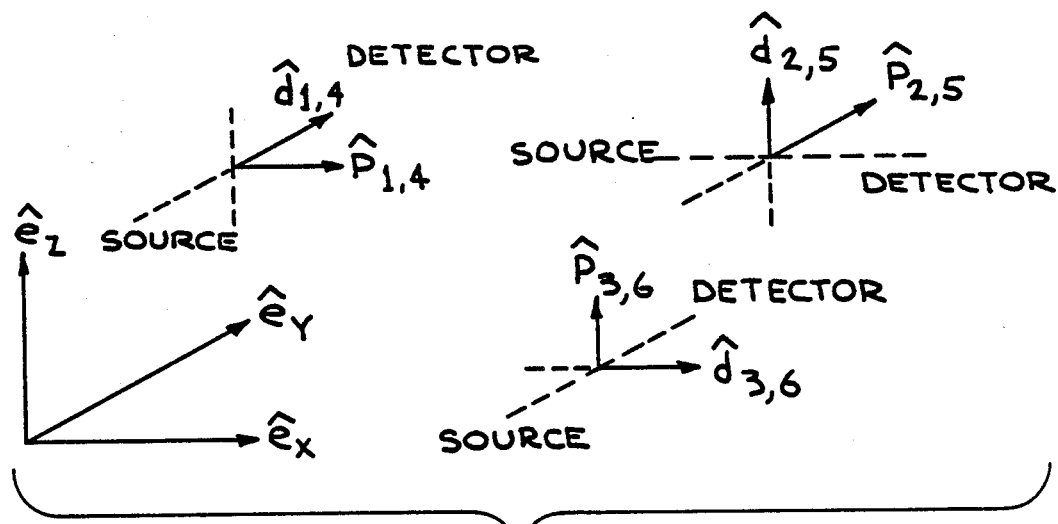
FIG. 2 shows three interferometer orientations that may be employed in a system of six interferometers that simultaneously sense rotation and acceleration plus gravity.

Consider an apparatus composed of six interferometers, labeled, 1–6, and denote the associated p and d vectors, masses, areas, dimensions and energies by corresponding indices. Interferometers 1–6 employ particles with masses $m_1$–$m_6$ and energies $E_1$–$E_6$ respectively, but with either $m_1$ different from $m_4$ or $E_1$ different from $E_4$. Similar restrictions shall also apply to $m_2$ and $E_2$ relative to $m_5$ and $E_5$, and to $m_3$ and $E_3$ relative to $m_6$ and $E_6$ respectively. Next, let $\hat{e}_x$, $\hat{e}_y$ and $\hat{e}_z$ represent three unit vectors specifying the coordinate system in the apparatus reference frame. Further, configure the interferometers 1–3 so that one of each of the three d vectors is along each of these axes, and one of each of the p vectors is also along each of these axes. Also configure interferometers 4–6 in a similar fashion. For example, let us take $p_1 = p_4 = d_3 = d_6 = \hat{e}_x$, $p_2 = p_5 = d_1 = d_4 = \hat{e}_y$, $p_3 = p_6 = d_2 = d_5 = \hat{e}_z$, as is shown in FIG. 2. Obviously, there is more than one way to do this, and any choice will suffice. Other configurations are also possible with the unit vectors $\hat{e}_x$, $\hat{e}_y$ and $\hat{e}_z$ not orthogonal, as long as they not all lie in the same plane. Then, the phase shifts $\gamma_1$ through $\gamma_6$ for the six interferometers will be given by $$\gamma_1 = C_1 \Omega_x + D_1(a+g)_y + O[\Omega, (a+g)_y, m_1, E_1] + S_1(E_1, m_1),$$

$$\gamma_2 = C_2 \Omega_y + D_2(a+g)_z + O[\Omega, (a+g)_z, m_2, E_2] + S_2(E_2, m_2),$$

$$\gamma_3 = C_3 \Omega_z + D_3(a+g)_x + O[\Omega, (a+g)_x, m_3, E_3] + S_3(E_3, m_3), \quad (3)$$

$$\gamma_4 = C_4 \Omega_x + D_4(a+g)_y + O[\Omega, (a+g)_y, m_4, E_4] + S_4(E_4, m_4),$$

$$\gamma_5 = C_5\Omega_y + D_5(a+g)_z + O[\Omega, (a+g), m_5, E_5] + S_5(E_5, m_5),$$

$$\gamma_6 = C_6\Omega_z + D_6(a+g)_x + O[\Omega, (a+g), m_6, E_6] + S_6(E_6, m_6),$$

where $\Omega_x$, $\Omega_y$, and $\Omega_z$ are the x, y and z components of the rotation rate (angular velocity) vector $\Omega$ and $(a+g)_x$, $(a+g)_y$ and $(a+g)_z$ are the x, y and z components of the acceleration plus gravity vector $(a+g)$. The coefficients $C_i$ and $D_i$ are given by $$C_i = \frac{4\pi m_i A_i}{h},$$

and $$D_i = \frac{\pi m_i^{1.5} L_i v_i}{h\sqrt{\frac{E_i}{8}}}.$$

The function $O(\Omega, (a+g)_j, m_k, E_k)$ represents the small higher order terms, while the functions $S_i(E_i, m_i)$ represent the inserted phase delay. The contribution to this function due to centrifugal forces is given by the line integral around the full two-path circuit $$O(\Omega, m_k, E_k)_{centrif.} = \frac{m_k^{1.5}}{h\sqrt{\frac{E_k}{8}}} \oint (\Omega \times r \cdot \hat{e}_s)^2 ds$$

where $\hat{e}_s$ is a unit vector parallel to the path at a point along the path, r is the vector from the center of rotation to that point, and ds is the differential of path length.

The set of equations (3) can be solved simultaneously to yield the rotation rate vector $\Omega$ and the net acceleration plus gravity vector $(a+g)$ in terms of the six measured phase shifts $\gamma_1$ through $\gamma_6$. In applications requiring high accuracy, the centrifugal force and other high order terms may be included. To do so, the radius vector r can be determined iteratively by integrating these equations to determine the position of the center of rotation and correcting for the contribution by these terms. An alternative procedure for finding r is to augment the interferometer set with matter-wave gradiometers (described below) to measure r directly. Thus, an interferometer set is capable of independently measuring rotation and acceleration plus gravity simultaneously.

(e) Limiting Atomic Beam-sag

The above phase-shift calculations have neglected transverse displacements of the paths due to the effects of rotation and acceleration plus gravity, and have assumed these to be straight-line trajectories. In the presence of rotational and gravitational (or the equivalent due to acceleration) forces on a propagating atomic beam, the beam will be deflected from a straight trajectory to a curved one. Thus, when the particles are freely propagating in vacuum, the paths will be the trajectories of classical particles propagating under the same potentials. Such trajectories will not be straight, but instead curved by these potentials. They will approximate parabolic arcs. The curvature will increase with increasing rotation rate and acceleration plus gravity. At even moderate values of these, the curvature may be so large as to prevent the beam from ever reaching the detectors. As a result, it is important that this curvature be removed for the construction of any inertial sensor system that is to achieve even a modest dynamic range.

Additional potentials can be applied along the particle trajectories to remove most or all of this curvature. That is, in order to maintain straight beam trajectories, it is necessary to apply an external compensating force to the atoms that cancels the deflecting force. Said deflecting force must compensate both the effects of rotation and of gravity plus acceleration. The force due to gravity plus acceleration can be compensated by applying a potential gradient in the direction of the net force due to gravity plus acceleration. The forces due to rotation can be compensated through the use of a gimbal system that maintains a fixed orientation for the interferometer system. They may also be compensated through the use of a velocity dependent force when a variety of atomic momenta are present in the interferometer system. When all atomic momenta present in the system are nearly the same, approximate compensation may be achieved by the application of a force perpendicular to the momenta. In terms of a quantum-mechanical description of the motion of the atoms, application of such a force translates into an externally applied potential gradient. For long, thin diamond shaped interferometer path geometries and negligible spread in beam momenta, a potential that increases linearly about a direction perpendicular to the interferometer axis will straighten the trajectories.

A potential gradient that will satisfy the above requirements is available for a limited range of conditions. It consists of a magnetic field with a gradient of its component that is parallel to the atoms' magnetic moments. Such a field compensates for sag over a narrow range of velocities and for one mass at a time when beam sag due to both rotation and acceleration must both be removed. However, it limits beam sag for a wide range of beam velocities when only the beam sag due to acceleration plus gravity must be compensated. When no rotation is present (e.g. when the system is mounted on gimbals), such a potential gradient only compensates for sag due to acceleration plus gravity for one mass value at a time, since the magnetic deflection force is independent of a particle's mass, while its force due to acceleration plus gravity is proportional to its mass.

The applied potential will produce additional phase shifts in the interferometer. However, if the inertial potentials are canceled by the externally applied potential, then so will be the phase shifts that are due to them. Thus, an externally applied field that removes the path curvature, also produces no net phase shift in the interferometer.

A feedback system that applies a potential that maintains straight trajectories will then apply a potential that keeps the phase shift of the interferometer null. Correspondingly, the magnitude of the applied potential necessary to keep the phase shift of the interferometer null is a direct measure of the combination of rotation and acceleration plus gravity that the system seeks to measure. That is, the error signal in such a feedback system provides a direct output signal of the interferometer.

For systems using polar molecules, electric field gradients will accomplish the same end. Examples of magnetic field geometries with the necessary gradients are given along with the preferred embodiments of the invention. It is recognized, however, that other geometries and potentials exist which will accomplish the same end, and that the scope of the patent is not limited to the examples of geometries and potentials presented below.

(f) Diffraction by Reflection from Crystal Surfaces

Classic experiments by Davidson and Germer, by Esterman, Frisch and Stern, and others have demonstrated that electrons, atoms, neutrons, etc. show diffraction phenomena in reflection by the surface of a crystal. This effect is known as Bragg reflection. Applicant has devised closed-circuit interferometer geometries that employ Bragg reflection of neutral atoms from crystal faces, which has never been done, here-to-fore. Examples of geometries that are sensitive to inertial effects are presented below. It is recognized, however, that other geometries exist which will accomplish the same end, and that the scope of the patent is not limited to the examples of geometry presented below.

While the above classic experiments generally employed naturally grown cleaved crystals such as LiF (or other chemical salts), applicant proposes a preferred use of artificially grown large crystals such as those grown from purified silicon.

A noteworthy distinction between applicant's invention and that by Altshuler and Frantz is that applicant's crystal face beam reflectors also function simultaneously as beam-splitters by employing simultaneous diffraction into more than one distinct order. The mode of operation of the crystal faces employed by Altshuler and Frantz exhibited only diffractive reflection at a single angle, and thus is ineffectual as a beam splitter.

(g) Deflection by Image Forces

Figure 3:
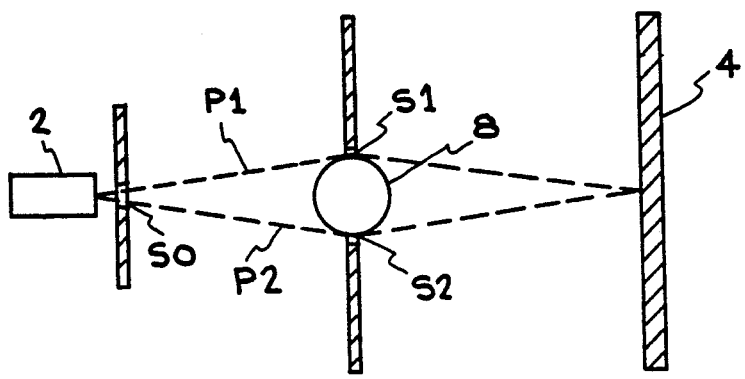
FIG. 3 is a diagram of a simple interferometer for neutral atom and/or molecule matter waves in which the deflection of the matter-wave paths is enhanced by interactions between a propagating particle and its electromagnetic image inside a central conducting barrier.

FIG. 3 is a diagram of an interferometer, similar to that of FIG. 1, in which the thin sheet between slits S1 and S2 is replaced by a suitably shaped (for example cylindrical) conducting barrier 8. The electric-dipole-induced- electric-dipole force between a passing atom and its electrical image formed inside the barrier will produce a deflecting force that will direct the atoms onto paths that converge in the beam recombination region. The existence of such forces (akin to van der Waal's forces) has been demonstrated by Raskin and Kusch (Phys. Rev. 179, p712, 1969). As a result, a wider spacing between slits S1 and S2 can be employed than that which can be used when the deflection of the atomic-beam paths at slits S1 and S2 is by diffraction alone. A wider spacing, in turn, translates into greater enclosed area and greater path displacement, and hence into higher sensitivity.

It is evident that deflections of polar molecules (i.e. those with permanent electric dipole moments) will be obtained also when such are in the proximity of a conducting surface. In this case the interaction is between the permanent electric dipole moment of the molecule and its image inside the surface. The configuration for the usage of this interaction to obtain large beam deflections when polar molecules are the propagating species is similar to that of the dipole-induced-dipole interaction discussed above.

(h) Diffraction by Electromagnetic Gratings

A diffraction grating for neutral atoms (and molecules) can be formed from a standing wave electromagnetic beam (such as that produced in the cavity of a laser) that is nearly resonant with an atomic transition of the atomic species. Such an electromagnetic beam passing transversely through the atomic beam will interact with the atoms more strongly at its field maxima than at its minima. The interaction will scatter atoms (or otherwise shift their quantum-mechanical phases) on a spatially periodic basis along the path of the electromagnetic beam. As a result, the electromagnetic beam will act as a diffraction grating. A suitable shape for the electromagnetic beam is that of a ribbon.

If the incident beam of atoms impinges diagonally on the standing-wave electromagnetic beam, then the frequency of a traveling-wave decomposition of the standing wave will be Doppler shifted commensurate with the velocity component of the atoms along the traveling wave. Different angles of incidence of the electromagnetic beam with the atomic beam will produce different Doppler shifts.

In cases where the Doppler shift is large relative to the resonance width, then for only a narrow range of such angles will the atomic transition's absorption spectral width overlap that of the electromagnetic wave's spectral width. Thus, atoms in only a narrow range of incidence angles will interact with the laser beam, i.e. those for which the natural atomic resonance overlaps the laser frequency. Two such resonances will occur symmetrically located at equal angles either side of a perpendicular to the standing electromagnetic wave. The angles for such a resonance will depend upon the beam's velocity. If atomic beam collimation limits the incidence angles, then the grating will act as a velocity selector also. If two standing wave electromagnetic beams are simultaneously superposed at a small angle with respect to each other, then resonances through the same atomic beam collimator will occur at two different velocity groups. The two velocity groups propagating along the same path can be used by the interferometer cell to distinguish rotation from acceleration plus gravity.

In cases in which the natural resonance width is comparable to or less than the Doppler shift due to the atomic beam velocity, Doppler velocity selection will not occur. Nonetheless, velocity selection by the natural action of a grating will still occur. In such cases the transmitted velocity spread of the gratings can be limited by suitably placed slits.

A standing-wave electromagnetic beam can be produced by reflecting a laser beam back upon itself by a mirror. Another means for producing such a beam is provided by the standing-wave naturally produced inside the resonant cavity of a laser.

(i) Closed-circuit Matter-wave Interferometers Using Gratings

Applicant has shown that it is perfectly consistent with generally accepted principles of modern physics to construct a closed-circuit matter-wave interferometer that uses diffraction gratings, although such has never been done here-to-fore. Either gratings comprised of a series of slits in a solid material or near resonant electromagnetic standing-waves will form a suitable grating for neutral atom matter waves. (The two slit case depicted in FIG. 1 is the simplest example of a multi-slit solid material grating). The gratings may be used in a neutral atom matter-wave interferometer for wavefront division, redirection and recombination. Gratings with a narrow spatial periodicity facilitate the deflection of atomic matter waves to large angles. Such gratings will achieve even larger deflections by working in a high diffraction order. Large deflections, in turn provide high sensitivity when the interferometer is employed as an inertial sensor.

Geometries, analogous to those by Weinberg et al., are suitable for such an interferometer. Applicant has devised generalizations of their geometries that also are employed. Both symmetric and asymmetric geometries, and even figure-eight geometries (for use as a gradiometer), are used. The diffraction gratings in a neutral-atom closed circuit interferometer are configured to accept simultaneously either various integral multiples of velocity (and/or wavelength) in different diffraction orders along the same paths, or to accept different velocities in the same or different orders along different paths, depending on the symmetry properties chosen for the path geometry.

Weinberg et al. discussed both laterally symmetric and asymmetric, but only longitudinally symmetric geometries. However, virtually all subsequent applications of their work by others involved the use of laterally asymmetric, longitudinally symmetric geometries. In particular, all closed circuit matter wave interferometers that use diffraction for path deflection built heretofore, including the electron interferometer of Marton et al. and the neutron interferometer of Bonse and Hart, employ a laterally asymmetric, longitudinally symmetric geometry. Moreover, both of these applications of Weinberg et al.'s geometry use zero'th and first order diffraction on the first and last gratings and first order diffraction on the middle gratings (as did Weinberg et al.). The limitation to zero'th and first diffraction orders in prior matter-wave interferometer is due to the fact that such interferometers for electrons and neutrons use Bragg diffraction. In the present case, the above limitation on diffraction orders does not apply since planar (two dimensional) gratings are used instead.

Suitable matter-wave path and grating configurations for a neutral atom matter-wave interferometer are shown in FIGS. 4a–4f. In these Figures the gratings are comprised either of slits in a solid material, or of standing electromagnetic waves. Matter waves are emitted by source 2, collimated by slits 10 and detected by detector 6. Additional baffles 12 select grating diffraction orders. In FIGS. 4a–4d, the first grating is 16, the last is 20, while the middle two (shown here as extensions of the same grating, but not necessarily restricted to be so) is 18.

Figure 4A:
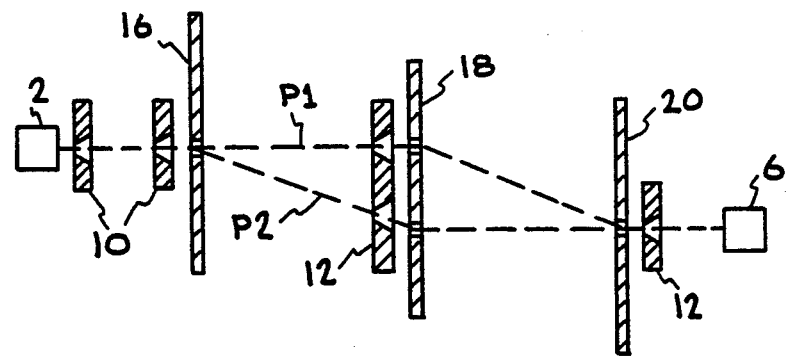
FIG. 4a is a diagram of a simple laterally asymmetric longitudinally symmetric grating interferometer for neutral atom matter waves.

FIG. 4a is a diagram of a simple laterally asymmetric, longitudinally symmetric grating interferometer for neutral atom matter waves. When the diffraction at the first grating 16 and last grating 20 is in zero'th and first order for the two paths, and is first order at the middle gratings 18, then the geometry is the same as that employed by Weinberg et al., by Marton et al. and by Bonse and Hart. Especially useful cases for large enclosed area neutral atom matter-wave interferometers, however, occur for diffraction at the first grating 16 and last grating 20 in zero'th and a high order n for the two paths, and in order n at the middle gratings 18.

Figure 4B:
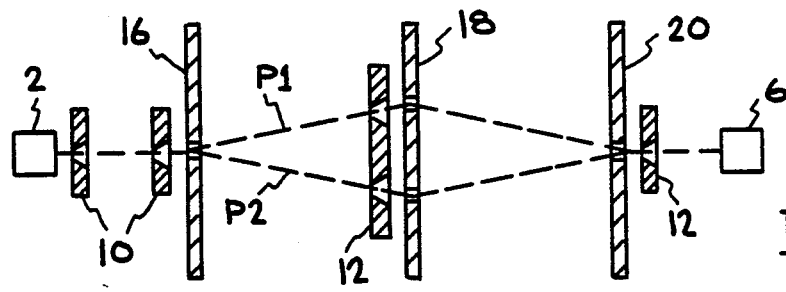
FIG. 4b is a diagram of a simple laterally and longitudinally symmetric grating interferometer for neutral atom matter waves.

FIG. 4b is a diagram of a simple laterally and longitudinally symmetric grating inteferometer for neutral atom matter waves. When the diffraction order at the first grating 16 and last grating 20 is plus or minus one, while it is two at the intermediate gratings 18, then we have the laterally and longitudinally symmetric case discussed by Weinberg et al. Especially useful cases for large enclosed area neutral atom matter-wave interferometers occur for diffraction at the first grating 16 and last grating 20 in high order ±n, and in order 2n at the intermediate gratings 18.

Figure 4C:
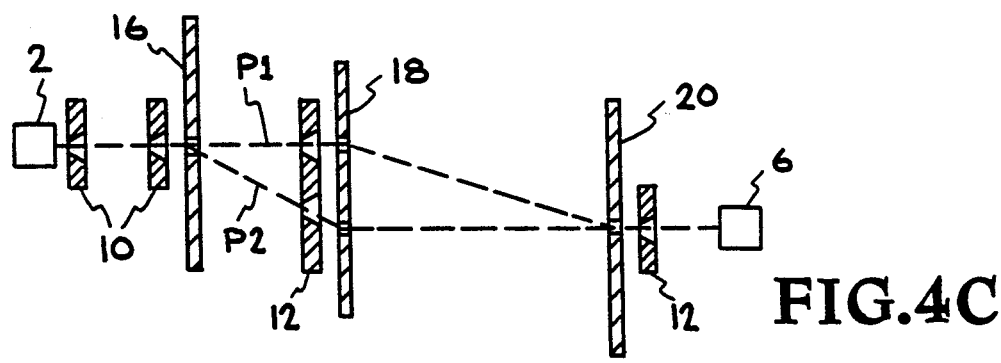
FIG. 4c is a diagram of a simple laterally and longitudinally asymmetric grating interferometer for neutral atom matter waves.
Figure 4D:
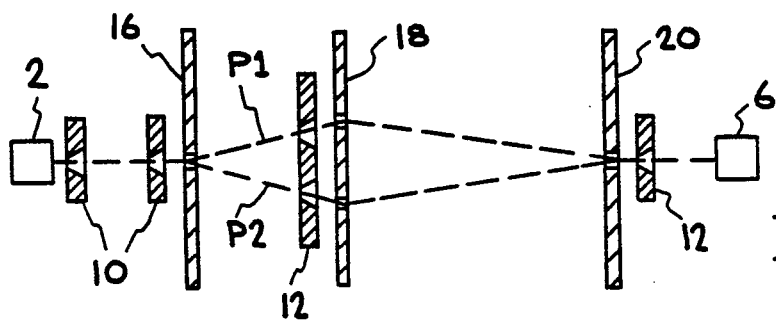
FIG. 4d is a diagram of a simple laterally symmetric but longitudinally asymmetric grating interferometer for neutral atom matter waves.

FIG. 4c is a diagram of a simple laterally and longitudinally asymmetric grating interferometer for neutral atom matter waves. FIG. 4d is a diagram of a simple laterally symmetric but longitudinally asymmetric grating interferometer for neutral atom matter waves.

Figure 4E:
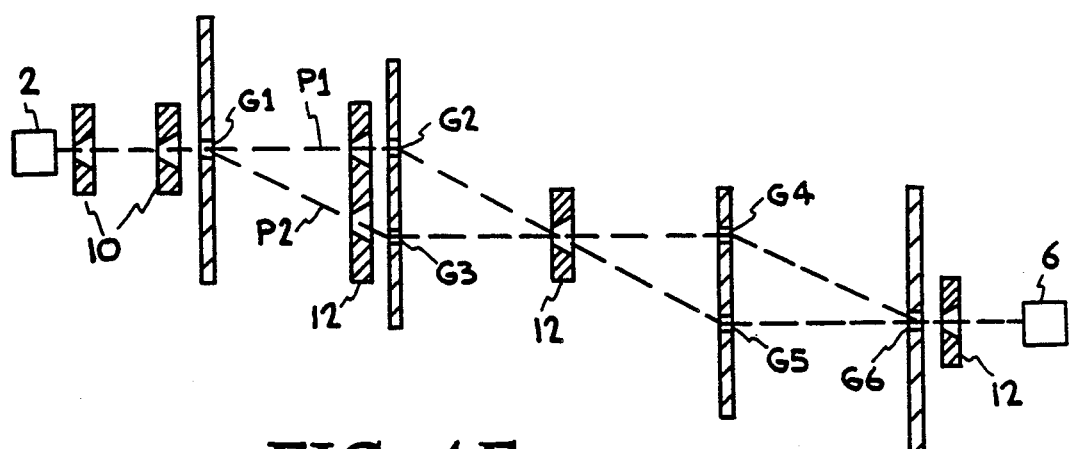
FIG. 4e is a diagram of a simple figure-eight path laterally asymmetric grating interferometer for neutral atom matter waves, useful for sensing gravitational gradients.
Figure 4F:
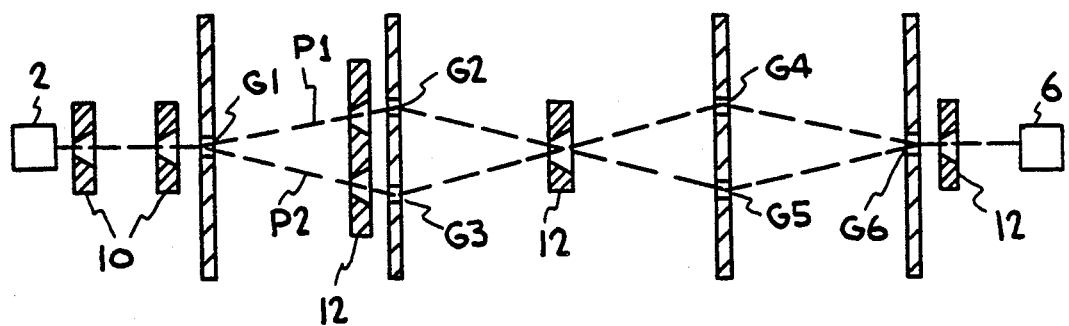
FIG. 4f is a diagram of a simple figure-eight path laterally symmetric grating interferometer for neutral atom matter waves, useful for sensing gravitational gradients.

FIG. 4e is a diagram of a simple figure-eight path laterally asymmetric grating interferometer for neutral atom matter waves. FIG. 4f is a diagram of a simple figure-eight path laterally symmetric grating interferometer for neutral atom matter waves. The configurations in FIGS. 4e and 4f are useful for sensing gravitational gradients.

The chromatic (wavelength dependent) properties of a neutral-atom matter-wave interferometer formed from a sequence of gratings are quite remarkable. Laterally symmetric cases provide a natural focusing mechanism for the paths onto the superposition region that is independent of the wavelength. Focusing is useful to provide a high throughput flux when the input atomic beam contains a wide spread of wavelengths. Laterally asymmetric cases provide a dispersive mechanism that facilitates selection of a narrow band of wavelengths from among those in the input beam.

The geometries depicted in FIGS. 4a through 4f can be simplified and improved by reducing the number of solid sheets with slits (baffles) through which matter waves must propagate. For example, in FIG. 4b the beam after exiting oven 2 and the collimating slit in the left sheet of collimator 10, must then pass through slits in six more sheets before it reaches detector 6, notably the right sheet of collimator 10, grating sheet 16, the left sheet of collimator 12, grating sheet 18, grating sheet 20, and the right sheet of collimator 12. The effect of a collimating sheet with slits adjacent to each grating is to limit the effective illumination and/or number of effective slits in the associated adjacent grating. The same end can be accomplished, however, simply by combining the grating and associated collimator sheets onto a single planar sheet.

The slit arrangements 269 and 270, 271 of FIGS. 11a, b provide examples of adjacent sheets thus combined. For example, in FIG. 4b the right sheet of collimator 10 can be combined with the sheet of grating 16 to form a sheet with the configuration of FIG. 11a, the left sheet of collimator 12 can be combined with the sheet of grating 18 to form a sheet with the configuration of FIG. 11b, and the sheet of grating 20 can be combined with the right sheet of collimator 12 to again form a sheet with the configuration of FIG. 11a. So doing, the six aforementioned sheets have been reduced to three. Similar combinations (and/or replacements) can be applied to the other configurations of FIGS. 4a–4f.

Another improvement to the geometries of FIGS. 4a–4f is to provide focusing in a direction parallel to the slits' long direction by applying mathematical principles for wave propagation discovered by Fresnel and frequently applied in the field of physical optics for light and other forms of electromagnetic radiation. Here, applicant applies this mathematics to the unfamiliar area of optics for neutral atom propagation through slits in solid sheets. An example of a slit configuration expected to provide focusing is given in FIG. 11c.

The aperture configuration of FIG. 11c is a modification of that of FIG. 11b, wherein the slit group 270, present in both FIGS. 11b and 11c, has been replicated end-to-end and displaced upward, with the slit length for each additional group decreased in length from that of an interior group. This replication then forms the three slit groups 272, 273, and 274. A similar downward replication forms a similar set of groups 279. Likewise replications of slit group 271 form the multiplicity of slit groups 278.

The displacements and slit lengths associated with these replications is such that the propagation path length from a point on the preceding grating through a given slit to a point on the subsequent grating is lengthened by an integral number of deBroglie wavelengths over a path between the same two points threading an adjacent slit or slit group. With this configuration, paths from outside groups or outside slits combine in-phase with other paths. In-phase path recombination provides a focusing mechanism to provide enhanced throughput. Although exactly this process occurs in diffraction of matter waves by a grating, the graded spacing allows adjustment for the finite geometry of the interferometer (exactly even spacing will apply for an infinitely long device).

Both the focusing improvement and the above sheet number reduction improvement can be accomplished simultaneously using the slit configurations of FIGS. 11a and 11c in a modification to the geometry of FIG. 4b. This modification is then similar to that described above for reducing the number of baffling sheets using FIGS. 11a, b. As above, the right sheet of collimator 10 is combined with the sheet of grating 16 to form the slit configuration 269 of FIG. 11a, and the sheet of grating 20 is combined with the right sheet of collimator 12 also to form the configuration of FIG. 11a. Now, instead of using the slit configuration of FIG. 4b for the middle pair of gratings, the left sheet of collimator 12 and the sheet of grating 18 are replaced by the single sheet slit configuration of FIG. 11c. The result is increased particle throughput.

A further improvement to the rectangular slit configurations of FIGS. 11a, b allows combining two orthogonally oriented interferometers with parallel axes into a single interferometer. The slit configurations of FIGS. 11d, e consist of concentric annular slits cut through a sheet of solid material. The annular slits 280 of FIG. 11d are approximately evenly spaced from the outer most ring to the center. In FIG. 11e, the annular slits 282 are approximately evenly spaced but do not extend to the center. Instead, the central portion 283 is solid. Radial arms 281 in both FIGS. 11d and 11e provide structure to support inner solid rings. Alternatively, structure not in the plane of the sheet can provide support for these inner portions of the gratings.

An axi-symmetric interferometer is created using the slit configurations of FIGS. 11a and 11c by a modification to the geometry of FIG. 4b. This modification is again similar to that described above for reducing the number of baffling sheets. The right sheet of collimator 10 is combined with the sheet of grating 16 and replaced by the single sheet slit configuration of FIG. 11d. The sheet of grating 20 is combined with the right sheet of collimator 12 also to form the configuration of FIG. 11d. For the middle pair of gratings, the left sheet of collimator 12 and the sheet of grating 18 are replaced by the single sheet slit configuration of FIG. 11e. It will be seen that with such replacements, any plane containing the axis of such an axi-symmetric interferometer reproduces the two-dimensional slit arrangement geometry of FIGS. 4b. That is, the two-dimensional geometry intercepted by this plane still consists of a single set of slits at the first and third sheets and two widely spaced groups of slits at the middle sheet.

An advantage of the axi-symmetric interferometer geometry thus created is that inertial effects can displace its fringe pattern at the final grating (and/or detector) in both a vertical direction (as in the plane of the drawing of FIG. 4b) as well as in a direction perpendicular to the plane of the drawing. Similar grating geometry replacements may be applied to the configurations of FIGS. 4d and 4f. FIG. 12b shows utilization of the geometry of FIG. 4f with such replacements.

Applicant's calculations (using Fresnel's mathematics) for this axi-symmetric and combined sheet modification to the interferometer of FIG. 4b yield the following results. The calculation employs neutral potassium atoms at a velocity 10 meters per second and the spacing between successive grating sheets is $R=1$ meter. The deBroglie wavelength of the atoms is about $\lambda \simeq 10$. Angstroms. The number $R_F$ (the first Fresnel zone radius for matter waves) is defined equal to the square root of the product of the atomic deBroglie wavelength, $\lambda$, and the longitudinal spacing between the first two grating planes R. For the above parameters we have $R_F \simeq 32$ microns.

The first grating has the configuration of FIG. 11d. A favorable outer radius for it is slightly less than $R_F$. This grating may have any number of circular slits (including only one) with the central point either open or closed. In the present example all slits have the same spacing $R_s$ (periodicity) and thickness, although in other embodiments it may be favorable to vary the thickness from one slit to the next. The first grating turns an incoming parallel matter-wave beam into a set of high intensity hollow coaxial conical beams that project from this grating high intensity annuli on their intersection with the plane of the second grating. In addition there is also a central beam (not necessarily hollow) projected by this first grating that is blocked by the central solid part 283 of the second grating. The radii of these conical beams at the second grating for beam N is then $R_N \simeq R \cdot \lambda / R_s$. The first conical beam is the most intense. For $R_s \simeq 2$ microns, the radius of this first hollow beam is then $R_{N=1} \simeq 480$ microns (about ½ mm). The radial thickness of the hollow beams depends inversely on the outer radius of the first grating. When that radius is of order $R_F$, then the radial thickness of the hollow beams is also of order $R_F$.

The second grating has the configuration of FIG. 11e. A favorable design for it places its slits 282 spanning the radial extent of the high intensity annulus created by this first (most intense) hollow beam. If the second grating's slit spacing is the same as that of the first, then the second will refocus the hollow beam into a pattern consisting of concentric high intensity rings, centered on the third grating. The third grating again has the slit configuration of FIG. 11d. This grating then acts as a fringe mask.

A common feature of the above configurations for interferometers is that they consist of a sequence of spaced solid sheets with each sheet having at least one aperture through which neutral particles and their associated matter waves pass. Matter-wave interference effects are especially evident when a propagation path appears to bend around a corner. This bending occurs when two or more paths overlap and interfere. A common feature of at least one such sheet's aperture configuration that in general causes such interference effects to be thus evident is created when there is at least one imaginary straight line segment that passes through a solid portion of that sheet when drawn between two points that both lie within the geometrical plane of that sheet and that both lie inside an aperture of that sheet. A multiplicity of apertures on the same sheet satisfies this condition, as does any single aperture that is not everywhere outwardly convex, such as an annulus.

(j) Differential Phase Shifter

Figure 5:
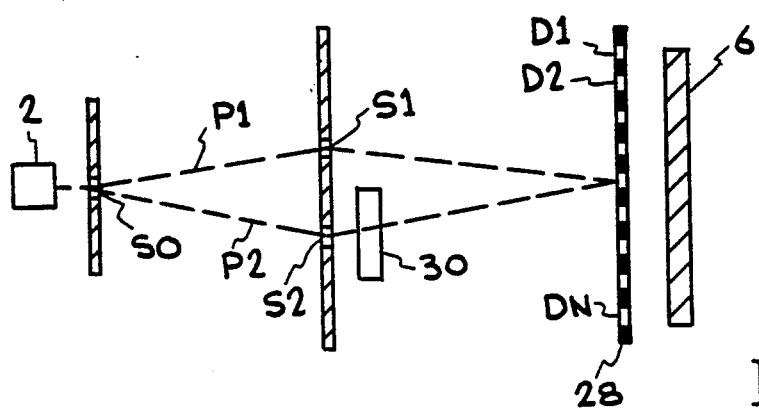
FIG. 5 shows a two-slit interferometer for neutral atom and/or molecule matter-waves with the inclusion of a differential phase shifter in the lower path and a fringe mask in front of the detector screen.

An alternative configuration to that of FIG. 1 is depicted in FIG. 5. Source 2, slits S0, S1 and S2 perform the same functions as before. An adjustable differential phase shifter 30 has been inserted in one of the matter-wave paths P2. A fringe mask 28 is positioned in front of the detector 6. The detector's dimensions span the extent of the fringe mask. The maxima and minima of the fringes essentially form a transverse standing matter wave across the fringe mask. The fringe mask consists of a set of slits D1-Dn, with a spatial periodicity matching the spatial periodicity of the transverse standing matter wave. It is positioned so that the various fringe maxima all simultaneously coincide with the slit openings for some value of the inserted phase delay. The last grating in the interferometer geometries discussed above essentially forms such a mask.

As the inserted differential phase delay is varied, there will be a corresponding sinusoidal variation in the detected flux as a function of the delay. The offset phase of this sinusoidal variation (as a function of delay) is a measure of the interferometer phase shift due to rotation and acceleration plus gravity. The frequency of this variation (as a function of delay) is related to the atomic-beam effective energy and interferometer cell area, quantities which are needed to determine the $C_i$ and $D_i$ coefficients described above. If more than one species or energy is passing through the cell simultaneously, then the phase and frequency of the variation as a function of delay for each species can be determined by a Fourier analysis of the detector current variation.

In practice, the insertion of an adjustable phase delay of one path relative to the other can be accomplished by various means. The beam-sag limiters discussed above perform just such a function. A differential phase shifter has additional useful functions. For example, if the inserted phase is made to rapidly alternate between 0 and 90 degrees and the interferometer phase difference is monitored synchronously with this alternation, then a two channel interferometer is created (0 and 90 degree channels respectively). If the rotation rate and/or acceleration plus gravity change, then the net interferometer phase shift will change. Monitoring both channels then will allow one to determine the sense of the change (plus or minus).

Another method for operation for a system with an adjustable phase delay insertion is to repetitively sweep the delay in time through many radians and monitor the detector response as a function of the inserted delay. If the sweep rate is rapid with respect to the rate of change of the phase shift due to changes in rotation rate and/or acceleration plus gravity, then the invention can determine the sense (+ or −) and magnitude of any change of the latter from one sweep to the next. Additionally, if the inserted phase delay depends upon the beam energy, then drifts of that energy can also be monitored. Moreover, if the interferometer cell's effective area depends, in turn, upon this effective energy (as it does if electromagnetic standing-wave gratings are used) then the effective enclosed area (and path displacement) can likewise be determined.

Another form of differential phase shifter is any device which laterally moves diffracting elements in the system, including moving the fringe mask. If slits or multi-slit gratings are employed for matter-wave deflection, these can be physically moved in a direction perpendicular to the interferometer axis by an electromechanical device such as a piezoelectric element. When standing-wave electromagnetic gratings are employed, the positions of these can be shifted by an electro-optical element. An advantage of this form of phase shifter is that it can respond much more rapidly to abrupt changes in rotation rate or changes in acceleration than can the magnetic variety discussed above, which take a particle transit time through the interferometer to act.

(k) Fringe-magnifier

The fringe mask 28 in FIG. 5 was specified above to have its slit spacing matched to the transverse spacing of the matter-wave fringes in the superposition region, where the maxima and minima of the fringes form a transverse standing matter wave. In an alternative mode of operation, the fringe mask is configured so that its slit spacing is only approximately matched to but slightly different from that of the transverse standing matter-wave. For this mode, detector 6 is replaced by a detector array such as detector screen 4 of FIG. 1. The difference between the periodicities will yield a slow transverse periodic variation of the transmitted intensity across the detector screen (i.e. a Moiré pattern is formed). The result is a highly magnified transverse fringe pattern that can be monitored by an array of detectors spaced much more coarsely than those of detector screen 4 in the configuration of FIG. 1. A small change in slit spacing can be produced by slightly tilting a fringe mask with a slit spacing equal to that of the standing matter-wave.

(L) Electromagnetic Fringe Detector

The last grating in a matter-wave grating interferometer, as discussed above, in addition to forming a fringe mask, can become an integral part of the detection system when electromagnetic gratings are used. In addition to the scattering of atoms at the maxima of electromagnetic standing waves, a reciprocal resonant scattering of the electromagnetic waves occurs. This scattered radiation can be imaged onto a detector array for the electromagnetic waves. For example, when the scattered electromagnetic waves have optical wavelengths, then a lens can be used to image them onto a detector such as a CCD array or vidicon tube. The output signal of that detector then provides the needed measurements of interferometer phase shift.

Alternatively, depending upon the intensity and wavelength of the electromagnetic waves and upon the level structure of the propagating atoms, particles such as ions and electrons may be produced by the interaction of the electromagnetic wave and the atoms. A suitable means for imaging and detecting the spatial distribution of the emitted particles also will allow one to determine the interferometer phase shift.

(M) Measuring Gravitational Gradients

Gravitational gradients (and or the position of the center of rotation, in the presence of rotation) can be measured by the apparatus described above by simply building two interferometers and displacing them from each other in position. However, a simpler more accurate system utilizing the same principles can also be built.

Matter-wave interferometers in which the two paths follow a two loop (figure-eight) structure are shown in FIGS. 4e and 4f. The paths are deflected at six locations G1-G6 by diffraction gratings. Deflection at G1 performs the initial wave-front division. Deflections at G2-G5 redirect the paths, while deflection at G6 provides wave-front recombination in the superposition region. The paths are composed of straight line segments and are configured so that the two loops of the figure-eight have equal areas.

Because the circuits about the two loops are oppositely directed, the net area that the matter waves circuit is zero. As a result, the interferometer will be insensitive to rotation, at least to the extent that one can neglect centrifugal acceleration. If the gravitational field acting on one of the loops is slightly different from that acting on the other loop, then the phase shifts due to gravity in the two loops will not exactly cancel each other. There will result a phase shift that will be proportional to this difference. Such will be the case when a gravitational gradient is present, and the difference between the gravitational fields acting on the two loops will be the gradient times the effective loop spacing. Thus, a neutral atom matter-wave interferometer with a figure-eight geometry will measure gravitational gradients.

Since a centrifugal force acts like a gravitational field with a gradient, and since the Coriolis force produces no phase shift in these configurations because of the interferometers' zero effective area, these configurations will measure the magnitude of the centrifugal force. Since the rotation rate can simultaneously be determined by an interferometer with non-zero area, the radius vector of the rotation can also be determined by a set of such devices.

Interferometers with three or more loops will correspondingly measure the second derivative of the gravitational field, etc.

(N) Use of Gratings for Focusing

Applicant is first to teach the use of gratings consisting of a multiplicity of slits in a solid sheet as beam-splitters for matter-wave interferometry. An extension of this invention is to use such gratings as focusing elements also as is done in the field of physical optics, e.g. the use of a Fresnel zone plate grating for focusing light and microwaves. This component of applicant's invention can be configured to form a Fresnel zone plate to act as a lens that focuses the diverging output of the applicant's velocity adapter and provides a more nearly parallel input beam to an interferometer, thus further reducing the spread of atomic velocity vectors. As such, it acts further as a velocity adapter.

Such focusing elements are shown in FIGS. 11f and 11g. As with the discussion of FIG. 11c given above, they also rely on the mathematics of Fresnel for wave propagation. FIG. 11f shows a circular ring structured focusing grating. FIG. 11g shows an astigmatic focusing grating with elliptical ring shaped slits 285, useful for correcting (or creating) beam astigmatism. In distinction with the annular slits 280 of FIG. 11d, the slits 284 of FIG. 11f have suitably graded spacings and widths. A propagation path through one annular aperture from a point on a preceding focal plane to a point on a subsequent focal plane is approximately an integral number of deBroglie wavelengths longer than a path between the same two points that threads an adjacent ring-shaped slit. Radial arms 281 (or other structure not necessarily in the plane of the grating) provide mechanical support for the annular ring structure of FIGS. 11f, g. When the subsequent focal plane is moved to infinity and the preceding plane is at a virtual focal point of the source, then a roughly parallel output beam is created from a diverging one.

(O) Mass Tomography with a Gravitational Gradiometer

Tomography is a methodology by which the internal three dimensional structure of an inaccessible volume is determined via a sequence of measurements performed with an apparatus located remotely from the volume. A familiar application that has revolutionized medical radiography is the CAT scan. With it, the three dimensional internal structure of a patient is mapped by passing a sequence of x-ray beams through his body. A computer then uses the x-ray transmission measurements to construct the desired three dimensional image.

Use of tomography is by no means limited to medicine, nor to x-ray transmission measurements. Applicant's invention teaches a new application of tomography. It exploits the weak gravitational attractive force of all bodies towards each other, and uses this force, along with applicant's sensitive gravity gradiometer or accelerometer, to map the mass distribution of an inaccessible volume. If the gradiometer (or accelerometer) is placed in a sequence of positions near the volume and measurements of the resulting gravitational gradient (or field) are performed, then, knowing the gradiometer's response to a given mass, it is straight forward to use the results to mathematically reconstruct the mass distribution within the volume. Nondestructive, non-intrusive inspection of inaccessible volumes (such as cargo containers) is then facilitated by applicant's invention.

An important inaccessible volume needing inspection is the earth itself. A neutral-atom interferometer employing applicant's gradiometer configuration may be transported by a surface vehicle, such as a ship, a submarine or a truck, an above surface vehicle such as an aircraft, spacecraft or earth orbiting satellite and then may be used to map the distribution of mass in the earth's crust, or even sense the approach of other vehicles or spacecraft. The motion of the gradiometer facilitates performing a sequence of measurements at different gradiometer positions, which, in turn, allows solution of the tomography problem. In cases wherein the vehicle provides an unsteady platform, vibrational isolation for the device is facilitated by the use of a gradiometer instead of an accelerometer. A properly designed suspension system for the apparatus will then provide a degree of isolation between it and vehicle vibrations.

A sequence of measurements allowing, at least, a partial solution to the mass tomography problem is afforded by lowering applicant's gradiometer into a hole bored into the earth, such as one bored in anticipation of locating natural resources such as petroleum or minerals. FIGS. 12a, b show applicant's invention employed in this application. A pair of figure-eight interferometers whose long axes are parallel to the bore hole provides azimuthal information concerning the location of density variations in the local earth surrounding the hole, such as those produced by narrowly missed pockets of gas. An embodiment that is simpler to construct but more cumbersome to operate contains only one gradiometer-configured interferometer, and provides azimuthal information by rotating it within the hole about its axis. Another embodiment, shown in FIG. 12b, combines the two orthogonal interferometers of FIG. 12a into a single axi-symmetric interferometer through the use of axi-symmetric gratings. A sequence of gradient measurements is performed for various positions of the apparatus within the bore hole. The variation of the gradient signal as a function of interferometer position within the hole is then analyzed to provide density distribution information about the surrounding nearby earth.

(P) Measuring an Electric Current with a Neutral Atom Interferometer

Magnetic fields and/or their gradients can affect the phase difference detected in a matter-wave interferometer, via the interaction of the neutral particle's magnetic moment with the field. When a current passes through a conductor near the propagation paths, it creates a magnetic field whose gradient affects the observed interferometer phase shift. This effect is exploited in various embodiments of the invention to create a differential phase shifter. It is also straight forward to turn this process around and to use the interferometer to infer the current that generates the field from the observed phase shift. Especially in configurations wherein the current actually threads an interferometer's enclosed area, a very sensitive ammeter is then created.

VIII. PREFERRED EMBODIMENTS

Any number of embodiments of the invention can be produced which employ matter-wave interferometry of neutral atoms and/or molecules. They can be used for sensing rotation and acceleration plus gravity, and/or gravitational gradients. Three basic configurations and variants of these are presented here which are illustrative preferred embodiments of the invention, and which encompass many of the elements of the invention. Configurations involving interchange and/or substitution of components from those indicated in the Figures provide additional preferred embodiments. It is recognized that additional embodiments are possible which employ simultaneously some or all of the elements of one or more of these embodiments, other species, and/or elements of conventional sensors. In view of the extreme sensitivity of matter-wave interferometers, configurations augmented by conventional sensors may be useful for extending the dynamic range of the invention as may be desirable, for example, in inertial guidance and navigation system applications. It is also recognized that even though each depicted embodiment describes a single interferometer, configurations involving a multiplicity of such units will be required for many applications.

While the descriptions presented herein describe what at present are considered preferred embodiments for the invention, it will be obvious to those skilled in the art that various changes, substitutions, modifications, and refinements may be made therein without departing from the invention.

Components for an embodiment of a matter-wave interferometric inertial sensor include the following:
(A) A suitable choice (or set of choices) of low-energy atomic/molecular species;
(B) A collimated atomic beam source;
(C) A velocity adapter capable of slowing down the beam atoms without severely reducing their flux in a given velocity interval;
(D) A copropagation deflector;
(E) An atomic-beam polarization adapter;
(F) An enclosed-area/displaced-path neutral atom (and/or molecule) matter-wave interferometer configuration, in which the matter-wave propagation paths enclose a finite area and/or are displaced from each other's position, comprising,
an entrance collimator and/or beam divider, path redirectors, and a phase sensitive beam-recombiner or superposition region;
(G) An alternative configuration to (F), above, for measuring gravitational gradients, in which the propagation paths sequentially enclose independent areas (or positional displacements) with such enclosures displaced from each other's position, between the entrance collimator (and/or beam divider) and the phase sensitive beam-recombiner or superposition region;
(H) A detector or detectors;
(I) A means for limiting or stabilizing the free-fall of a slow atomic beam (beam-sag limiter);
(J) A differential phase shifter;
(K) A high-vacuum system enclosing all paths for atomic/molecular-beam propagation;
(L) Servo controlled gimbals;
(M) Associated monitors for any of the above;
(N) Suitable electronic circuitry and data processing hardware and software for analysis of the results for the desired application.

Some of these components are optional, depending upon the desired system sensitivity, accuracy, cost and complexity.

(A) Choice of Atomic or Molecular Species

From Eqs. (1) and (2), an interferometer's sensitivity to rotation and acceleration plus gravity is a function of particle mass and kinetic energy. Thus, employing matter waves associated with low energy, high mass atoms and/or molecules will provide high sensitivity. Also a plurality of atomic species can be used simultaneously to extend the dynamic measurement range of the invention. Depending on the choice for other system components (e.g. upon the use of an electromagnetic standing wave as a grating, the use of laser cooling and slowing in the velocity adapter, etc.) another desirable feature is that the chosen species have an energy level with allowed electromagnetic resonance transitions to it from the ground state. Moreover, the wavelength of the associated electromagnetic radiation should be as short as possible (to provide a fine grating periodicity, thereby maximizing the enclosed cell area), yet still within the range of presently available electromagnetic radiation sources such as lasers.

Cesium, rubidium, thallium, mercury and sodium atoms, and $Cs_2$, CsRb and $I_2$ molecules are among the suitable choices for use in this invention. Mercury is especially attractive in that it is a very heavy atom (A=198–204) and simultaneously has short wavelength resonance transitions (2537 and 1850 Å), although suitable lasers at these wavelengths may be difficult to obtain and/or expensive. Atomic sodium and rubidium have the advantage that laser cooling of these species has already been demonstrated. When crystal surfaces are used in a Bragg reflection mode for matter-wave path deflection, division and recombination, a heavy noble gas atomic species such as krypton or xenon may be used to prevent adsorption on the crystal faces.

(B) Collimated Atomic-beam Source

The atomic-beam source depends upon the species employed. A suitable source for the species examples given above in an effusive oven similar to that commonly used in an atomic-beam apparatus. Effusive oven 3, containing species 1, is shown behind collimating slits 5 and 11 in FIGS. 6a, 6b, behind collimating slits 5 and 71 in FIG. 7a and behind collimating slits 5 and 163 in FIG. 8a, with the combination producing a collimated atomic (or molecular) beam. Source 2 and collimating slits 10 (or slit S0) function similarly in FIGS. 1, 3, 4a–4f, and 5.

Such ovens can be fabricated from a suitable refractory metal such as tantalum or molybdenum and heated with embedded wire coils insulated from the oven by ceramic sleeves. Ramsey (Molecular Beams, Oxford, London, 1969) describes applicable atomic and molecular beam methodology. The source and associated collimating slits should provide a well collimated beam. A supersonic jet type source of the type described by English and Zorn (in Methods of Experimental Physics Vol. 3, (2nd Edition), D. Williams, ed., Academic Press, New York, 1972) as well as the flowing of a gas such as Argon through the jet may also be used for an increased flux and a narrower resulting velocity distribution.

Heating the slits and/or apertures will help prevent their clogging by a buildup of condensed beam-particles. Indeed, down-stream beam defining elements within the system such as slits 17 and 19 and mirror 15 in FIGS. 6a and 6b, and slits 71 and 81, mirror 15 and lens 105 in FIG. 7a, and crystals 167, 169, 179, 181, 183, and 185 and slits 163, 195 and 197 in FIGS. 8a and 8b may also benefit from such heating. Alternatively, cooling such elements with liquid nitrogen will prevent re-emission of adsorbed beam particles on them.

(C) Beam-velocity Adapter

Methods for generating nearly mono- energetic and, more importantly, slow atomic beams have recently been demonstrated. When the species is a molecule, it can be slowed and cooled by similar techniques. Low velocity is desirable for high sensitivity. An important feature of such slow beams is that the de Broglie wavelength of the species varies inversely with its momentum. A long de Broglie wavelength is desirable for other reasons as well. Achieving acceptable fringe visibility with short wavelengths requires extremely small slit dimensions and extreme mechanical rigidity of the interferometer geometry, while longer wavelengths significantly ease these requirements and simplify the construction. Additionally, if diffraction is used for redirecting the beam, the enclosed area of the interferometer that can be incorporated increases with increasing wavelength, further increasing the sensitivity to both rotation and acceleration plus gravity.

The embodiment of FIGS. 6a and 6b, uses a variant of the pulsed technique by Ertmer et al. In it, the velocity adapter is configured to produce two different velocities, each with a narrow velocity spread. The narrowness is desirable to yield a high fringe visibility (fringe contrast). These two velocities are produced one at a time in rapid alternation. Although either the pulsed or continuous velocity adaptation technique can be used here, the pulsed technique was selected for the embodiment of FIGS. 6a and 6b since rapid velocity change of the beam is readily accomplished by this technique via electro-optically tuning the laser pulse characteristics on alternate pulses.

In FIGS. 6a and 6b, a ribbon shaped laser beam 13 is reflected by mirror 15, passes through the interferometer entrance slit 11 and interacts with the atomic beam from oven 3 in region 7. The atomic beam is thereby slowed and cooled. The laser beam is pulsed and its wavelength changes during the pulse ("chirped"), thereby cooling and slowing a group of atoms. Alternate laser pulses have different intensities and/or durations so that the associated slow atomic-beam pulses have different velocities upon passing through slit 11.

An alternative embodiment for the configuration of FIGS. 6a and 6b is to have the velocity adapter and source produce two different masses simultaneously. To do so, oven 3 is loaded with a mixture of the two species. The associated laser beam then alternates between two chirped pulses with different wavelengths, each appropriate to its respective species.

In the embodiment of FIG. 7a, the associated interferometer cell produces its own additional velocity (and matter-wave de Broglie wavelength) selection, which can be even more selective than that of the velocity adapter. It does so by using standing-wave laser beam 123 to form electromagnetic diffraction gratings 87, 89, 91, 93, 97, 99 and 101. Similarly, the embodiment of FIGS. 8a, b, produces its own additional velocity selection, by using Bragg reflection by the faces of crystals 167, 169, 179, 181, 183, and 185. In these embodiments the velocity adapter functions to match the peak of the input velocity distribution to the interferometer cell to that selected by the cell itself in order to maximize throughput. Suitably configured, it eliminates overlapping diffraction orders in the interferometer cell.

The velocity adapters in the embodiments of FIGS. 7a and 8a employ the continuous technique by Prodan et al. Cooling and slowing occurs by radiation pressure from laser beam 125 acting on the atoms. FIG. 7a shows reflection of this laser beam by mirror 15, and its subsequent passage through center slit 81, and slit 71. In FIG. 8a it enters by passing through a hole in crystal 179 and then through slit 163. In both Figures it then passes into tapered solenoid 115 where it interacts with the atomic beam produced by oven 3 and slit 5. As atoms propagate through solenoid 115, they are slowed and cooled by radiation pressure from laser beam 125. As their velocity (and correspondingly their Doppler shift) decreases, they advance to regions with an increasing magnetic field corresponding to the taper of solenoid 115. The resulting increased Zeeman energy shift maintains their resonance, and hence their interaction with laser beam 125.

The laser cooling and decelerating elements of the beam velocity adapter used by the embodiments of FIGS. 12a, b produce a diverging and/or astigmatic velocity distribution. Most interferometer configurations work best with a parallel input beam velocity distribution. To correct the divergence and astigmatism in the embodiment of FIG. 12a, focusing grating 265 is employed. It has a slit configuration similar to that shown in FIG. 11g. Correspondingly, in the embodiment of FIG. 12b, focusing grating 365 performs a similar function. Since the source in this latter embodiment has negligible astigmatism, a slit configuration similar to that shown in FIG. 11f is employed for the focusing grating.

(D) Copropagation Deflector

A velocity adapter that uses radiation pressure requires a laser beam that propagates coaxially (at least approximately) with the associated atomic beam. In the configurations of FIGS. 6a, b, 7a, b, and 8a, b, the various downstream slits are sufficiently wide to permit the velocity adapter laser beams to be injected via small mirrors 15 that do not disrupt the atomic beams so that the laser beams then propagate unobstructed to the interaction region (e.g. region 7 in FIGS. 6a and 6b) where they are (at least approximately) collinear with the atomic beams.

In alternative embodiments, various apparatus components may obstruct the injection of the velocity adapter laser beam. As a result, either the laser beam, the atomic beam, or both must be deflected to allow counter-propagation of the laser beam and the atomic beam. Thus to avoid obstructions, in FIGS. 6a and 6b, mirror 15 deflects laser beam 13, and likewise in FIG. 7a, it deflects laser beam 125. These laser beams are incident on the mirrors 15 from a direction that is perpendicular to the interferometer cell plane. As an alternative, when the slits are too narrow to allow injection through them, the laser beam may be injected by reflecting it off the front surface of the interferometer cell entrance slit (slit 11 in FIGS. 6a and 6b and slit 71 in FIG. 7a). Another alternative is to allow the laser beam (or beams) to impinge on the atomic beam diagonally at an acute angle.

In situations in which deflection of the laser beam is either unfeasible or insufficient, then the atomic beam may be deflected away from the laser beam to permit the injection of the latter. Various methods for deflecting the beam are possible. An inhomogeneous magnetic field will provide an appropriate deflecting force when it interacts with the atom's magnetic moment. Such a field can be produced by a Stern-Gerlach type of magnet, a two-wire magnet, or a multipole focusing magnet. Suitable examples of these configurations are described by Ramsey (ibid.). Another means for deflecting the beam is to allow resonant laser light to impinge perpendicularly on the beam and allow the radiation pressure of the light to provide the deflecting force.

The embodiment of FIG. 8a uses a beam deflection method that is due to I. Rabi (loc. cit. Ramsey, p395). Atomic beam 189 is deflected by the magnetic field gradient that it experiences as it passes from magnetic field 166 to magnetic field 165. Uniform magnetic field 166 is generated by solenoid 150, while uniform magnetic field 165 is generated by solenoid 152. Laser beam 125, passes though a hole in crystal 179, through one of the slits 163 and is collinear with atomic beam 189 in solenoid 115.

(E) Atomic-beam Polarization Adapter

The means for differential phase-shifting and/or that for beam-sag limitation may require that the magnetic moments of the atomic-beam particles be polarized or aligned in a specific direction. In embodiments that employ laser cooling and slowing, the velocity adapter and/or deflector will usually produce a polarized beam. For alternative embodiments in which the velocity adapter does not produce a polarized or aligned beam, a magnetic state-selector similar to one of those described for use as an atomic-beam deflector can be employed for this purpose also.

In the embodiment of FIGS. 6a and 6b, the velocity adapter produces a beam whose polarization is parallel to the long direction of slits 11, 17 and 19. This direction is already suitable for the atomic-beam sag limiter, so that a constant background magnetic field 41 prevents precession of this polarization.

In the embodiment of FIG. 7a, the velocity adapter produces a beam polarized parallel to the beam axis, whereas the beam-sag limiter and differential phase shifter require a beam that is polarized perpendicular to the cell plane. The polarization shift is accomplished in this embodiment by configuring the externally applied magnetic fields to slowly rotate along the propagation path into the cell so that the atomic magnetic moments adiabatically readjust themselves to the new applied field direction. The conditions for such an adiabatic precession are described by Robiscoe (Amer. J. Phys. 39, p146, 1971). In FIG. 7a the required slowly rotating field is produced as the fringing fields of solenoid 115 diminish, and the dominant field becomes uniform magnetic field 41. Similarly, in FIG. 8a the required slowly rotating field is produced as the fringing fields of solenoid 115 diminish, and the dominant field becomes uniform magnetic field 166. Magnetic fields 165 and 166, although of different magnitudes, are in the same direction and serve to maintain the beam polarization.

In the embodiments of FIGS. 12a, b the atomic beam is polarized parallel to the interferometer axis throughout. This polarization is maintained by the magnetic field produced by solenoid 237. The quarter-wave plates 221 produce circularly polarized light for cooling and deceleration. Thus, the polarization adaption is performed on the laser light instead.

(F) Interferometer Cell for Measuring Rotation and Acceleration Plus Gravity A neutral atom interferometer cell for measuring rotation and acceleration plus gravity is comprised of the following set of components: a path geometry that encloses a finite area so that it is sensitive to rotation; a path geometry with the paths displaced from each other so that it is sensitive to acceleration plus gravity; an entrance collimator; a beam divider; path redirectors; a phase sensitive beam-recombiner or recombination (superposition) region.

One embodiment of such an interferometer cell is shown in FIGS. 6a and 6b. This configuration is a straightforward extension of that of FIG. 1. The cell entrance collimator slit 11 also acts as a beam divider. The path redirectors are slits 17 and 19. The slits deflect the incident atomic beam by the matter-wave equivalent of diffraction of light by a slit, as is familiar in the study of the physical optics of light. The superposition region is on the surface of hot wires 21. The matter-wave paths 9 pass from slit 11, through slits 17 and 19, and terminate on hot wires 21. Two hot wire detectors are used, staggered laterally about the cell axis so that they each sample a slightly different matter-wave phase shift. Monitoring both signals from the two electron multipliers 25 allows the sense of any change in the inertially induced phase shift to be determined.

Since the de Broglie wavelength of the atoms is on the order of Angstroms (Å), in order to achieve acceptable fringe visibility, the necessary slit widths (and/or transverse spacings) for the embodiment of the interferometer cell shown in FIGS. 6a and 6b will be on the order of microns when the spacing between the entrance collimating slit 11 and redirecting slits 17 and 19 and between slits 17 and 19 and detector surfaces 21 is on the order of meters. Such slits may be readily fabricated using techniques currently common in the microelectronics and semiconductor industries. For example, a sheet of metal or other suitable material may be selectively milled via a plasma-etch or other suitable process to thin dimensions and then slits cut through the thin portions also by an electron-beam or plasma-etch process. Alternatively, one can cut holes in a sheet of metal or other suitable material, deposit into these holes a material such as crystalline salt, thereby filling them back up to a flush surface. A metallic film can then be deposited by an evaporation process onto the surface, except at points where the slits are desired to be which are covered by a mask. Finally, the salt can be removed by dissolution. Another method for fabricating the slits is to use carefully sharpened and lapped metal knife edges, as was done by Leavitt and Bills (ibid.).

An alternative means for fabricating a slit or sequence of slits is to form a grid of very fine wires or fibers.

Artificially grown pure crystaline silicon is an especially useful base material for slit fabrication. Currently available techniques allow it to be milled to sub-micron dimensions. A silicon structure can be overcoated with a thin film of high nuclear charge (high Z) refractory metal to provide it with opacity to soft x-rays.

FIG. 11b shows an alternative arrangement for the slits 17 and 19 in the embodiment of FIGS. 6a, b, allowing the embodiment to utilize a geometry similar to that of FIG. 4b. The two slits groups of grating 18 selected by preceding two-slit collimator 12 are then combined with those collimating slits, allowing all such slits to be formed by the same sheet.

FIG. 11a shows an alternative arrangement for slit 11 in the embodiment of FIGS. 6a, b, allowing it to utilize a geometry similar to that of FIG. 4b. The slits of grating 16 selected by the last slit of collimator 10 are combined with that slit so that all such slits are formed by the same sheet. In addition, to allow the embodiment of FIGS. 6a, b to utilize the geometry of FIG. 4b, the slit arrangement of FIG. 11a is inserted in the path geometry of FIGS. 6a, b immediately in front of hot-wire detectors 21 to act as a fringe mask.

FIG. 11c shows an alternative slit arrangement to that of FIG. 11b that focuses the paths in the long direction of the slits. A detailed description of its structure and function is provided above. Each of the two slit groups of FIG. 11b has been replicated end-to-end, with each such replicated group decreased in length from that of an interior group. The spacings and lengths of the slits themselves within each group also decrease slightly as one proceeds from an inner slit to an outer one. The additional slit groups and uneven slit spacing allow focusing of the paths to increase flux throughput. Moreover, for the same outer most slit end to outer most slit end length, the ladder-like cross members 286 allow the configuration of FIG. 11c to be mechanically stronger than that of FIG. 11b. A simpler construction method for the configuration of FIG. 11c maintains equal slit spacing and slit width within the slits of each group. This end-to-end replication technique may also be applied to the grating of FIG. 11a with similar focusing resulting there.

Another embodiment of an interferometer cell is shown in FIG. 7a. It uses standing-wave laser beams as electromagnetic diffraction gratings. These gratings are configured to produce three cells simultaneously. Gratings 87, 89, 91 and 97, and gratings 87, 93, 91 and 101 each produce a laterally asymmetric grating interferometer cell, while gratings 87, 89, 93 and 99 produce a laterally symmetric grating interferometer cell. The entrance collimator is slit 71, while the extensions of gratings 89, 91 and 93 are limited by the set of three slits 81. The beam divider is grating 87, that operates order zero and a high order n. The path redirectors are gratings 89, 91 and 93. Gratings 89 and 93 operate in orders n and 2n, while grating 91 operates in orders zero and n. The superposition region is on gratings 97, 99 and 101, each of which acts simultaneously as a fringe mask, a fringe magnifier and a fluorescent detector screen. These three gratings (extensions of the same grating) are tilted at a small angle relative to the interferometer axis, while gratings 87, 89, 91 and 93 are perpendicular to this axis.

The embodiment of FIG. 7a uses a matter-wave beam with a narrow velocity spread and only one mass at a time. The velocity adapter is configured to produce a continuous very low velocity atomic beam. The velocity is low enough that the natural atomic-resonance width is comparable to or less than the Doppler shift of laser beam 123 that is due to the atomic beam's velocity. Thus, depending upon the species choice, Doppler velocity selection by the gratings may not occur. Additional velocity selection (over and above that produced by the velocity adapter), however, does occur by the action of the gratings and the slits 71 and 81. With no Doppler velocity selection, a single laser beam 123 serves to create all of the electromagnetic gratings 87, 89, 91, 93, 97, 99, and 101. It is generated by narrow bandwidth laser 117 that is tuned to a wavelength near that of an electromagnetic resonance of the chosen species. Lenses 124 focus it into a parallel ribbon-shaped beam. The laser beam 123 is split into three beams by partially reflecting mirrors 75, and then reflected back upon itself by mirrors 69 to form the standing-wave gratings.

Another embodiment of an interferometer cell for simultaneously measuring rotation and acceleration plus gravity is shown in FIG. 8a. It uses crystal surfaces for wavelength selective reflection of atomic beam 189. The entrance collimator is slit 163. The beam divider is crystal 179, that reflects the beam simultaneously in two different directions that correspond to different diffraction orders, and/or reflections from a different set of crystal planes. The directions are selected by slits 195. The path redirectors are crystals 181 and 183. The superposition region is on the face of crystal 185. The embodiment of FIG. 8a uses a beam with a narrow velocity spread and only one mass at a time. Additional velocity selection (over and above that produced by the velocity adapter), however, occurs by the action of the diffracting crystals. Matter-wave paths 191 are displaced from each other and enclose a finite area so that the embodiment is sensitive to both rotation and acceleration. This embodiment has the feature that large enclosed areas can be obtained with a compact device via the narrow lattice spacing of the crystal, which yields large diffraction angles.

(G) Interferometer Cell for Measuring Gravitational Gradients

An embodiment of an interferometer cell for measuring gravitational gradients is created by simply replacing the path geometry of the interferometer shown in FIG. 7a by that shown in FIG. 4e and/or 4f. Gratings G1–G6 in FIGS. 4e and 4f can be driven by the same standing-wave laser beam as was done in the embodiment of FIGS. 6a, b by splitting the laser beam into four rather than three parts as was done in the embodiment of FIG. 7a. Since the two loops of the figure-eight geometries of FIGS. 4e, f enclose equal areas, but are circuited in opposite directions, the interferometer is insensitive to rotation and acceleration plus gravity, but sensitive to gravitational gradients.

Another embodiment of an interferometer cell for measuring gravitational gradients is created by simply replacing the path geometry of the interferometer shown in FIG. 8a by that shown in FIG. 8b. In this alternative geometry, the matter-wave paths circuit two equal areas in opposite directions, so that the interferometer is insensitive to rotation and acceleration plus gravity, but sensitive to gravitational gradients. In the embodiment of FIG. 8b the matter waves are reflected by crystals 167 and 169, while the path geometry is fixed by slits 197.

FIG. 12a shows an embodiment of the invention that is suitable for use in petroleum (or mineral) exploration when lowered into a bore hole. It consists of two orthogonally oriented, gradiometer-configured interferometers, whose axes 261 and 263 are each parallel to the axis 240 of the bore hole. Atoms such as potassium, cesium, or rubidium effuse from dual-port oven 201, through collimating slits 202 and 203 creating two ribbon shaped beams 229 and 231 that propagate along interferometer axes 261 and 263, respectively. The thin directions of these beams are perpendicular to each other. Solid-state lasers 219 provide frequency chirped cooling and decelerating electromagnetic radiation that is given a circular polarization by quarter-wave plates 221, and focused by astigmatic lenses 223. Mirror 227 reflects the light from one of these lasers, while partially silvered mirror 225 combines the two laser beams. This source of cooling decelerating radiation is similar to one described by Watts and Weiman [Optics Lett. 11, 291 (1986)]. The radiation is reflected by mirror 233 to copropagate in a direction anti-parallel with atomic beam 229 and focus on the collimating slit 203. Radiation from a second such source (not shown) is reflected by mirror 205 to copropagate anti-parallel to atomic beam 231. Mirrors 205 and 233 thus act as copropagation deflectors and have thin slits, 254 and 253 respectively, cut in them to allow passage of the cooled decelerated atomic beam. Perpendicularly oriented astigmatic focusing gratings 265 improve the beam velocity parallelism.

Cooled beam 229 propagates through grating 207, consisting of a set of slits configured as per FIG. 11a, with the slit long direction oriented to allow passage and diffraction of the beam. Grating 207 splits beam 229 onto two sets of paths which propagate through the various slits of grating 209, collimator 211, the various slits of grating 213, thereby traversing a figure-eight path 250 and recombining on grating 215. One set of paths threads through differential phase shifting solenoid 239. Gratings 209 and 213 contain slit configurations similar to those of FIGS. 11b or 11c, while the slit configuration of grating 215 is configured as per FIG. 11a. Detector 217 is similar to hot-wire pair 21 of FIGS. 6a, b and its associated components. The passage of beam 231 is similar to that of beam 229, with the path defining components 202, 205, 208, 210, 212, 214, 216, 218, and 251 similar to their respective counterparts 203, 233, 207, 209, 211, 213, 215, 217, and 239, but rotated 90° about the (parallel) interferometer axes, corresponding to the perpendicular ribbon shaped atomic beam orientation.

FIG. 12b shows an alternative embodiment to that of FIG. 12a. It consists of a single gradiometer-configured interferometer, and contains many components common to the embodiment of FIG. 12a. Oven 301 has one exit port. Collimator 303 produces a conical shaped atomic beam 329, and lenses 323 correspondingly produce a conical beam of cooling decelerating radiation. The interferometer utilizes the axi-symmetric grating configuration shown in FIG. 11d for gratings 307 and 315, and that of FIG. 12e for gratings 309 and 313. Collimators 303 and 311 each has a circular aperture (rather than a slit) while mirror 333 has an elliptical aperture 353 that appears circular when viewed by oven 301 or by the incident laser radiation. Focusing grating 365 has the axi-symmetric configuration of FIG. 11f and diminishes the transverse spread of beam velocities. Gratings and apertures are symmetric about axis 361.

The multiplicity of paths for the embodiment of FIG. 12b is a set of coaxial hollow conical shaped paths that form a "figure-eight of revolution" 350 (revolved about the figure-eight's long axis), rather than the set of ribbon shaped figure-eight paths 250 used by the embodiment of FIG. 12a. It will be seen, however, that any plane containing the interferometer axis in the axi-symmetric interferometer of FIG. 12b reproduces the two dimensional slit arrangement geometry of either of the interferometers of the embodiment of FIG. 12a. The number of possible conical-shaped particle paths depends upon the number of circular slits in gratings 307, 309, 313, and 315. Preferred dimensions for these are discussed above. Detector 317 contains four hot wires and can detect particle flux gradients in both directions transverse to the interferometer axis.

(H) Detector(S)

The choice of atomic-beam detector will depend upon the species 1, chosen. If the species choice is an alkali metal such as sodium, cesium or rubidium, a molecule containing such an alkali metal, or from among some of the alkaline earths, it can be detected by surface ionization on a hot wire followed by measuring the resultant emitted ion current. This current is easily measured with an electron multiplier or other means. Hot-wire contaminants can be rejected, if necessary, by focusing the ions thus produced through a mass spectrometer.

The embodiment of FIGS. 6a and 6b detects the atomic beam in the superposition region by surface ionization on hot wires 21, followed by acceleration through negatively biased slits 23. A mass spectrometer is produced by allowing the ions to propagate along paths 27 in the presence of magnetic field 41. The ions are then detected by electron multipliers 25. Hot wires 39 and biased ion collector plates 37 are used for coarsely detecting atomic beam sag in the direction parallel to the long direction of the slits. The signals from these are used for coarse servo control of the atomic beam sag-limiting magnetic fields. Fine control is obtained from the signals from an orthogonal interferometer whose acceleration sensitive axis is in this direction.

The embodiment of FIGS. 8a and 8b detects the atomic beam in the superposition region by surface ionization on hot wire 175, followed by acceleration through negatively biased slit 173. A mass spectrometer is produced by allowing the ions to propagate in the presence of magnetic field 165. The ions are then detected by electron multiplier 177.

An alternative means for detecting the atoms is to monitor resonance fluoresence light from the beam that is due to an incident resonant laser beam. Multi-photon ionization of the beam by laser excitation followed by monitoring the emitted ion or electron current by suitable means such as an electron multiplier is another means for detecting the atoms. Such techniques are now standard in atomic-beam experimentation. Many of them are discussed by Ramsey (ibid.).

A fringe mask may be placed in the superposition region. It consists of a series of slits formed from a solid material, and is followed by a detector with large dimensions. Alternatively, the fringe mask, itself, can act as a fluorescent screen, by forming it from a standing-wave electromagnetic grating. The resulting emitted light (or particles if photo-ionization or molecular photo-dissociation occurs) can be detected by a detector. Suitable detectors are a photomultiplier in the case where light is emitted, and an electron multiplier when charged particles or metastable atoms are emitted. Alternatively the emitted light or charged particles can be imaged onto an image sensing detector such as a CCD (solid-state charge-coupled-device) or silicon diode array in the case where light or electrons are emitted, or a vidicon when light is emitted.

In the embodiment of FIG. 7a, electromagnetic gratings 97, 99 and 101 each act simultaneously as an electromagnetic fringe mask, as a fluorescent detector screen and as a fringe magnifier. The light emitted at these gratings by resonance fluorescence of laser beam 123 and the atoms in the matter-wave beam is focused by lens 105 onto an optical image sensing CCD detector array 107 at locations 109, 111 and 113.

(I) Atomic-Beam Sag Limiter

The purpose of a beam sag limiter is to provide sufficient gradient to the component of the magnetic field that is parallel to the atomic magnetic moments (which are polarized perpendicular to the interferometer plane) to cancel curvature of the matter-wave paths that result for the presence of inertial forces. Such a field will also null out the interferometer phase shift. An additional part of the sag limiting system (not shown in the Figures but built according to standard engineering practice) is an electronic feedback system that servo controls this field to maintain such a null. Its error signal provides the interferometer data output signal. That is, the error signal is proportional to the sum of the rotation and acceleration plus gravity phase shifts.

FIGS. 9a and 9b show an embodiment of a set of conductors that will generate the magnetic fields to limit beam sag. Discussion of these Figures will reference coordinate system 149. The conductors in FIG. 9a consist of a solenoid 147 and eight additional conducting bars 131, 133, 135, 137, 139, 141, 143, and 145, while those in FIG. 9b are coils 130. Additional conductors to supply the currents that flow through these conductors are not shown, but are positioned in such a manner that they generate no additional unwanted fields. In use, coils 130 reside inside solenoid 147, with the matter-wave paths of the interferometer fitting between them.

The conductor set shown in FIGS. 9a and 9b is used with both of the embodiments of FIGS. 6a, and 6b and FIG. 7a. Coil 147 is shown both on FIG. 7a and FIG. 9a. A few of the turns of coil 147 are omitted to allow passage of the atomic beam that exits slit 5 and laser beam 123. When used with the interferometer embodiment shown in FIGS. 6a and 6b, solenoid coil 147 completely surrounds all of the elements shown in FIGS. 6a and 6b and the turns need not be omitted. When the alternative embodiment to that of FIGS. 6a and 6b that uses two different masses is employed, then the fields must be alternated between two different values for each mass.

In FIGS. 9a and 9b, the interferometer axis is specified to be (approximately) in the z-direction. Coil 147 creates a uniform magnetic field 41 in the embodiments of FIGS. 6a and 6b, and 7a, that maintains the direction of the atomic magnetic moments along the y-axis.

Conductors 131, 137, 139, and 145 all carry the same current magnitude and are all parallel to the z-axis. They are spaced on a pattern that is nearly square in the x-y plane. The current flow directions of conductors 131 and 145 are the same as each other, but opposite to those of conductors 137 and 139, as indicated by the arrows at their left ends. So configured, these four conductors apply a gradient in the y-direction to the y-component of the magnetic field. The field applied by these four conductors thus deflects the matter-wave paths in the y-direction.

Conductors 133, 135, 141, and 143 are all parallel to the z-axis and are spaced on a pattern that is a rectangle in the x-y plane. The extent of the rectangle in the x-direction is about forty percent of its extend in the y-direction. The current flow directions and magnitudes for all four conductors are equal. So configured, these four conductors apply a gradient in the x-direction to the y-component of the magnetic field. The field applied by these four conductors thus deflects the matter-wave paths in the x-direction.

Coils 130 are wound so that successive turns span greater and greater extent in the z-direction. Thus they produce a field in the y direction whose magnitude varies in the z-direction. The field applied by these two coils thus deflects the matter-wave paths in the z-direction.

FIG. 10 also shows an embodiment of a set of conductors to generate sag-limiting magnetic fields. It is similar to but more compact than that of FIGS. 9a and 9b. It replaces coil set 130 by four conducting bars 151, which perform the same function. Their operation is similar to that of bars 133, 135, 141 and 143. It is used with the more compact interferometer embodiment shown in FIG. 8a. Solenoid coil 150, shown in FIG. 8a is omitted from FIG. 10 to improve Figure clarity. Coil 152 is shown in both FIG. 8a and FIG. 10. It surrounds the interferometer cell of FIG. 8a. Omitted turns in solenoid coil 152 allow the passage of laser beam 125 and atomic beam 189.

In the embodiments of FIGS. 12a,b, when the interferometer axes 261 and 263, or 361 are not vertical then the interferometer paths will tend to sag (curve) away from these axes. The sag is compensated in these embodiments by magnetic field gradients produced by current flow through bars 241, 243, 245 and 247, which are oriented parallel to the interferometer axes. Bars 241, 243, 245 and 247 each consist of four bars, behind each other, thereby hiding their plurality in FIGS. 12a,b. They all run parallel to the interferometer axes. The eight bars 241 and 245 then function in a manner similar to that of bars 131, 133, 135, 137, 139, 141, 143 and 145 in FIG. 9a. Correspondingly, the eight bars 243 and 247 compensate for sag differential between the first and second loops of each interferometer's figure-eight path. Additional detectors (not shown) may be inserted immediately ahead of collimators 211, 212 and 311 to sense this differential sag.

Even when the interferometer axes of FIGS. 12a,b are vertical, the sloping path elements will not be vertical and thus tend to curve away from a vertical direction. This curvature is compensated in two ways. First, tapered solenoid 237 provides both an axial magnetic field and an axial magnetic field gradient. To allow passage of the laser beam, the solenoid has a small gap that is bridged by fringing fields and/or additional turns near this gap. Alternatively, the lasers and their associated components may be located inside the solenoid. The axial field maintains the atomic magnetic moment orientation parallel to the interferometer axis, while the gradient provides an upward directed force (potential gradient) to counteract the sag. Second, the inter-planar spacings between gratings 207 and 209, between grating 209 and collimator 211, between collimator 211 and grating 213, and between gratings 213 and 215 are not necessarily equal, but may monatonically decrease as the paths proceed upward. The spacing variation then compensates for the particle beam's slowing down in the gravitational field it climbs. Gratings 307, 309, 313, and 315 and collimator 311 are similarly spaced in FIG. 12b.

(J) Differential Phase-Shifter

An adjustable phase delay of one path relative to the other may be inserted by various means. Its usage is outlined above. One form of a differential phase shifter is the sag limiter discussed above. This form deflects the matter-wave paths and simultaneously differentially shifts their phase. It uses magnetic field gradient to produce different magnitudes of the magnetic field on the two paths as well as a deflecting force on the atoms. The field, acting on an atom's magnetic moment, shifts the energy of the atom and thereby shifts its quantum-mechanical phase. Each path, experiencing a different field, will then exhibit a different phase shift as well as a deflection.

A second form for a differential phase-shifter is one that does not simultaneously deflect the paths. An example of this form is shown in FIGS. 7a, 8a and 8b. It employs a magnetic field applied to the atoms on one path, that differs from that of the other path. This field has negligible gradients, and thus negligible path deflections. The appropriate magnetic field direction is parallel to the polarization of the atomic beam (perpendicular to the plane of the cell) in order not to induce polarization changes in the beam (spin flips) as the beam atoms pass through the field.

In the embodiments of FIGS. 7a, 8a and 8b, magnetic fields are produced by passing electric currents through ribbon shaped conductors 83 and 85, parallel to an associated matter-wave path. They produce a magnetic field parallel to the polarization of the beam (perpendicular to the cell plane).

Figure 7B:
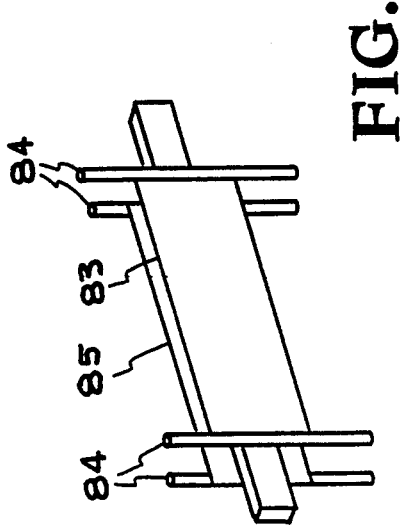
FIG. 7b is a perspective view of the differential phase shifter used in FIG. 7a. Electric current flows in and out of the conducting ribbons through the cylindrical wires connected to their ends.

FIG. 7b shows a perspective view of the matter-wave beam passing between a pair of such ribbon shaped conductors 83 and 85. Current is fed into and out of the ribbons by wires 84 at their ends that run perpendicular to the interferometer cell plane. The current flow in a ribbon 85 is equal to and oppositely directed to that of ribbon 83. A nearly uniform magnetic field is formed between the ribbon pair by these currents. Varying the currents of an associated pair of ribbons varies the phase delay of the matter-wave path that passes between them.

Coils 239 and 251 of an electric conductor each thread the associated interferometer path loops in FIG. 12a and provide differential phase compensation for the interferometers. Passing a current through such a conductor provides a magnetic field parallel to the looped paths and a simultaneous anti-parallel field along the unlooped paths. Since, in this embodiment, the propagating atom's magnetic moments are approximately parallel to the paths, their total energy (and hence their associated phase advance) will differ between the looped and unlooped possible paths. Thus, the applied field will produce a detectable phase difference between the recombining paths.

An additional application of the apparatus is for measuring this current by measuring the phase shift produced by the current in coils 239 and 251. A simpler embodiment for thus realizing an ultra sensitive ammeter instead employs a geometry similar to that of FIGS. 4a or 4b, rather than the one shown here that is similar to the geometry of FIG. 4f.

Differential phase compensation is provided in the configuration of FIG. 12b by moving at least one of the gratings in an oscillatory (or circular) fashion in a direction perpendicular to the interferometer axis, and measuring the detected signal variation that is synchronous with this motion. The movement, for example, may be accomplished by piezoelectric actuators.

(K) High-Vacuum System

A system that produces a high quality vacuum encloses all paths for atomic-beam propagation in all of the above embodiments. It is necessary to prevent scattering of the beams by residual gas in the system. Production of such a vacuum is common practice today and can use a wide variety of commercially available components and standard techniques. The vacuum chambers and components are not shown in the Figures.

For example, surrounding the components of FIG. 12a and FIG. 12b are heavy vessels. A portion 292 of such a vessel's wall is shown in FIG. 12b. They provide a suitable vacuum while simultaneously resisting the external pressure exerted by surrounding drilling mud and water 295 residing in the bore hole. Spring 291, dashpot 293, the pendulum action of supporting cable 294, and the viscosity of surrounding drilling mud and water 295 form portions of a vibration isolating suspension for the interferometer.

(L) Gimbal System

The beam sag-limiting system outlined above will not limit sag due to rotation when a variety of momenta or masses are present. A spread of momenta will exist when the velocity adapter (or interferometer cell) passes a wide spread of velocities (as may be desired to yield high matter-wave beam throughput), or when large deflection angles are used (as in the case of the embodiment depicted in FIG. 10). In such cases, beam sag due to rotation can be compensated by mounting the interferometer system on gimbals that maintain it in a fixed orientation.

Since the interferometer systems depicted in FIGS. 8a and 8b employ a wide variety of path directions, they are mounted on gimbals which prevent their rotation. They do so by servo controlling their angular positions with the resulting rotation rate signals, and thereby maintain null the interferometer phase shift.

At high rotation rates, the embodiment of FIGS. 6a and 6b may also require gimbals if the atomic velocity spread is significant. This is because a spread of areas through the interferometer, in the presence of a spread of beam velocities will yield a low fringe visibility at high rotation rates. Gimbals can be used to limit the rotation rate experienced by the interferometer in this embodiment.

The embodiment of FIG. 7a employs only a single atomic velocity and a single mass at a time. Thus, more than one such interferometer system is thus required to get the data at two different velocities. However, since the momenta in this embodiment are all nearly collinear and contain negligible spread, it requires no gimbals and can be run in strap-down mode.

(M) Associated Monitors

Careful control and monitoring of the parameters such as beam velocities, laser wavelengths and intensities, magnetic fields, etc. is necessary if one is to achieve maximum sensitivity of the invention. Suitable apparatus for doing so is not always shown in the Figures, but recognized as necessary. The beam-sag detectors 37, 39 are examples of such a monitor.

Another example of such a monitor provides an added feature for the embodiment of FIGS. 6a and 6b. It consists of an in-situ X-ray path-length stabilization scheme. Low energy X-rays are created by electron beam 29 impacting on anode 31. The material of anode 31 and energy of electron beam 29 are selected so that line radiation from a K or L line of this material has a wavelength that closely matches that of the atoms. The X-rays pass through a hole 36 in the oven 1. The material forming slits 5, 11, 17, 19 and 33 has a high nuclear charge (such as that of lead) so that the slits are opaque to these X-rays. The X-rays will then travel along approximately the same paths 9 as do the atoms and also form an interference pattern in the vicinity of detector surfaces 21. Since the mass of the X-rays is zero, their interference will be affected negligibly by rotation and/or acceleration plus gravity. Any undesirable flexure or positional change of the slit geometry, however, will cause their interference to change. It will be detected as a change in the flux of X-rays detected by X-ray detector 35. By monitoring the X-ray interference, in addition to that of the matter-waves, the flexure of the slit geometry can be compensated.

FIG. 7a shows an in-situ X-ray interferometer for geometry monitoring. Its operation is similar to that of FIGS. 6a and 6b. X-ray source elements 29 and 31 and detector elements 33 and 35 function in a manner similar to that of FIGS. 6a and 6b. X-rays are collimated by slits 90. Diffraction of X-rays is by gratings 92 which form a grating interferometer with a geometry similar to that of FIGS. 4a–4d. The gratings 92 and slits 90 and 33 are made from a material that has a high nuclear charge (such as that of lead) so that the slits are opaque to the X-rays. The gratings are rigidly mounted on the mirrors 69 so that they sense positional displacements of these mirrors, which, in turn, determine the lateral positions of the electromagnetic gratings in the embodiment.

An in-situ X-ray geometry monitoring system can also be used with the embodiments in FIGS. 8a and 8b, since X-rays will experience reflections at the crystal faces along with the atoms. Its implementation is similar to that of FIGS. 6a and 6b, but is not shown on FIGS. 8a nor 8b.

(N) Electric Circuitry and Data Processing System

Suitable electronic circuitry and data processing for analysis of the results for the desired application should be included. In an application of the invention to inertial navigation and guidance, the appropriate equations for inertial guidance must be solved. A discussion of the equations can be found, for example, by Broxmeyer (ibid.), O'Donnell (Inertial Navigation—Analysis and Design, McGraw Hill, New York, 1964), Pitman (Inertial Guidance, John Wiley an Sons, Inc., New York, 1962), and the NATO AGARD lecture series notes (ibid.), which are herein incorporated by reference. Additionally, Eqs. (3), etc. must also be solved by the data system. Commerically available digital computers are suitable for these and other such necessary tasks.

Changes and modifications in the specifically described embodiments can be carried out without departing from the scope of the invention which is intended to be limited only by the scope of the appended claims.

I claim:

1. Apparatus for measuring the spatial gradient of a gravitational field, comprising
   a means for producing neutral particles selected from atoms and molecules,
   an interferometer, including propagation path defining means, in which the particles and their associated matter waves propagate along a plurality of positionally separated paths, with a geometry in which the paths are positionally separated from each other and have a negligible average lateral positional displacement from each other, wherein the paths circuit about opposite sides of two approximately equal adjacent areas in a figure-eight configuration, with each path circuiting in an opposite sense about each of the two areas, and a region where the quantum-mechanical matter-waves associated with the particles interfere,
   a means for detecting the interference between the matter waves,
   a means for providing some isolation between the interferometer and the vibrations of its environment.

2. Apparatus for measuring an electric current, comprising
   a means for producing neutral particles selected from atoms and molecules,
   an interferometer, including propagation path defining means, in which the particles and their associated matter waves propagate along a plurality of positionally separated paths and a region where the quantum-mechanical matter-waves associated with the particles interfere,
   at least one electric conductor passing near at least one of the propagation paths, carrying a current to be measured,
   a means for measuring the matter-wave phase shift produced by the electric current's magnetic field.

3. Apparatus for producing neutral particle matter-wave interference, comprising
   a source of neutral particles selected from atoms and molecules, means for collimating the neutral particles into a beam,
   a means for diminishing the spread of velocity vectors among particles issuing from the source,
   a neutral atom interferometer, further comprising
      a sequence of spaced, substantially planar solid sheets, each sheet having at least one aperture therethrough positioned so that the particles and their associated matter waves propagate through said apertures, and with the aperture arrangement on at least one of the sheets configured so that there is at least one imaginary straight line segment that passes through a solid portion of that sheet when drawn between two points that both lie within the geometrical plane of that sheet and that both lie inside an aperture of that sheet, a region where the quantum-mechanical matter-waves associated with the particles interfere, means for detecting particles that pass through the slits in the sequence of sheets.

4. Apparatus of claim 3, wherein the propagation paths and apertures are configured so that at least one propagation path passing through an aperture of a sheet is approximately an integral number of deBroglie wavelengths of the propagating particles longer than another path that passes through a different aperture of the same sheet.

5. Apparatus of claim 3, wherein a sheet contains a multiplicity of separate apertures and these apertures form groups with the groups also separated from each other.

6. Apparatus of claim 3, wherein at least one of the apertures has the form of a slit.

7. Apparatus of claim 6, wherein there are at least two slits in the same sheet that are approximately parallel and side by side.

8. Apparatus of claim 6, wherein there are at least two slits in the same sheet that are approximately parallel and spaced end to end.

9. Apparatus of claim 6, wherein the slit is not straight.

10. Apparatus of claim 9 wherein the slit's mid-line approximately forms the shape of an ellipse.

11. Apparatus of claim 10 wherein the slit is broken into elliptic arc segments, thereby increasing the plurality of slits through the sheet forming it.

12. Apparatus of claim 10 wherein a multiplicity of slits in the same sheet form nested ellipses.

13. Apparatus of claim 10 wherein the ellipse is a circle.

14. Apparatus of claim 10 wherein the ellipse's center is located within an aperture.

15. Apparatus of claim 10 wherein the ellipse's center is located on a solid portion of the sheet.

16. Apparatus of claim 3, wherein a sheet is formed by a set of fibers laid approximately in the same plane with a gap between adjacent fibers forming an aperture.

17. Apparatus of claim 3 wherein at least a portion of at least one sheet is supported by an additional structure that does not lie in the plane of that sheet.

18. Apparatus of claim 3, further comprising at least one electrically conducting surface in close proximity to at least one propagation path.

19. Apparatus for producing neutral particle matter-wave interference, comprising a source of neutral particles selected from atoms and molecules, means for collimating the neutral particles into a beam, a neutral atom interferometer, further comprising a crystal face that reflectively splits the beam into a plurality of positionally separated coherent beams which propagate along positionally separated paths, at least one crystal face that reflects at least one of the spatially separated beams, a crystal face where the quantum-mechanical matter-waves associated with the particles in the spatially separated beams interfere and reflect, means for detecting particles that have been reflected by the crystal faces.

20. Apparatus of claim 19, wherein at least one of the crystals is comprised of a chemical salt.

21. Apparatus of claim 19, wherein at least one of the crystals is silicon.

22. Apparatus of claim 19, wherein at least one of the crystals is an artificially grown crystal.

23. Method for obtaining information concerning the mass distribution of adjacent matter by measuring the spatial gradient of the gravitational field produced by the matter, comprising producing a collimated beam of neutral particles selected from atoms and molecules, forming an interferometer by propagating the particles and their associated matter waves along a plurality of positionally separated paths in an interferometer with a geometry in which the paths are positionally separated from each other and have a negligible average lateral positional displacement from each other, by providing paths that circuit about opposite sides of two approximately equal adjacent areas in a figure-eight configuration with each path circuiting in an opposite sense about each of the two areas, locating the interferometer near the matter whose mass distribution is to be measured, detecting the interference of the matter waves in a region where the quantum-mechanical matter-waves associated with the particles interfere, 24. Method of claim 23, further comprising moving the interferometer relative to the adjacent matter.

25. Method of claim 23, further comprising moving the adjacent matter relative to the interferometer.

26. Method of claim 23, comprising measuring at least a portion of the earth itself.

27. Method of claim 23, further comprising isolating to some extent the interferometer from the vibrations of its environment.

28. Method of claim 26, comprising measuring information related to the earth's natural resources.

29. Method of claim 26, further comprising lowering the interferometer into a hole that has been bored into the earth.

30. Method for measuring an electric current, comprising producing neutral particles selected from atoms and molecules, collimating the particles into a beam, propagating the particles and their associated matter waves along a plurality of positionally separated paths to a region where the quantum-mechanical matter-waves associated with the particles interfere, passing near at least one of the propagation paths an electric current to be measured, measuring the phase shift of the matter waves produced by the magnetic field produced by the electric current.

31. Method for producing and detecting neutral particle matter-wave interference, comprising providing a source of neutral particles selected from atoms and molecules, collimating the neutral particles into a beam,
diminishing the spread of velocity vectors of particles issuing from the source,
providing a neutral atom interferometer, by further
aligning a sequence of spaced substantially planar solid sheets, each sheet having at least one aperture therethrough,
propagating the particles and their associated matter waves through said apertures,
configuring the aperture arrangement on at least one of the sheets so that there is at least one imaginary straight line segment that passes through a solid portion of that sheet when drawn between two points that both lie within the geometrical plane of that sheet and that both lie inside an aperture of that sheet,
providing a region where the quantum-mechanical matter-waves associated with the particles interfere,
detecting the particles that pass through the apertures in the sequence of sheets.

32. Method of claim 31, further comprising configuring the propagation paths and apertures so that at least one propagation path passing through an aperture of a sheet is approximately an integral number of deBroglie wavelengths of the propagating particles longer than another path that passes through a different aperture of the same sheet.

33. Method of claim 32 for focusing neutral particle matter wave beams in an interferometer, further comprising configuring the aperture configuration so that constructive interference occurs in at least one focal region and destructive interference occurs elsewhere.

34. Method of claim 31, further comprising forming at least one of the apertures into the shape of a slit.

35. Method of claim 31, further comprising providing separate apertures in the same sheet that form groups which are also separated from each other.

36. Method of claim 34, further comprising forming at least two slits in the same sheet that are approximately parallel and side by side.

37. Method of claim 34, further comprising forming at least two slits in the same sheet that are approximately parallel and spaced end to end.

38. Method of claim 34, wherein the slit is not straight.

39. Method of claim 38 wherein the slit's mid-line approximately forms the shape of an ellipse.

40. Method of claim 39 for increasing the plurality of apertures through the sheet forming the elliptic slit, further comprising breaking the elliptic slit into elliptic arc segments.

41. Method of claim 39 further comprising providing a multiplicity of slits in the same sheet wherein the slit mid-lines form nested ellipses.

42. Method of claim 39 wherein the ellipse is a circle.

43. Method of claim 39 further comprising locating the ellipse's center within an aperture.

44. Method of claim 39 further comprising locating the ellipse's center on a solid portion of the sheet.

45. Method of claim 31, further comprising forming a sheet by laying a set of fibers approximately in the same plane with a gap between adjacent fibers forming an aperture.

46. Method of claim 31 further comprising supporting at least a portion of at least one sheet by providing additional structure that does not lie in the plane of that sheet.

47. Method of claim 31, further comprising providing at least one electrically conducting surface in close proximity to at least one of the propagation paths.

48. Method for producing neutral particle matter-wave interference, comprising
providing a source of neutral particles selected from atoms and molecules,
collimating the neutral particles into a beam,
reflectively splitting the beam into a plurality of positionally separated coherent beams at a crystal face,
propagating the plurality of beams along positionally separated paths,
reflecting at a crystal face at least one of the positionally separated beams to make it converge with at least one of the other beams,
locating a reflecting crystal face in a region where the spatially separated beams converge and interfere,
detecting the particles that have been reflected by the crystal faces.

49. Method of claim 48, further comprising fabricating at least one of the crystals from a chemical salt.

50. Method of claim 48, further comprising fabricating at least one of the crystals from silicon.

51. Method of claim 48, further comprising fabricating at least one of the crystals by artificial growth process.

* * * * *